United States Patent
Rouen et al.

(10) Patent No.: US 11,261,290 B2
(45) Date of Patent: Mar. 1, 2022

(54) METHOD FOR THE POLYMERIZATION OF CYCLOOLEFINS BY MEANS OF RING-OPENING METATHESIS

(71) Applicant: DEMETA, Rennes (FR)

(72) Inventors: Mathieu Rouen, La Bouexiere (FR); Frédéric Caijo, Thorigne Fouillard (FR); Pierre Queval, Vezin le Coquet (FR); Fabien Tripoteau, Bedee (FR)

(73) Assignee: DEMETA, Rennes (FR)

( * ) Notice: Subject to any disclaimer, the term of this patent is extended or adjusted under 35 U.S.C. 154(b) by 30 days.

(21) Appl. No.: 16/955,812

(22) PCT Filed: Dec. 20, 2018

(86) PCT No.: PCT/FR2018/053452
§ 371 (c)(1),
(2) Date: Jun. 19, 2020

(87) PCT Pub. No.: WO2019/122746
PCT Pub. Date: Jun. 27, 2019

(65) Prior Publication Data
US 2020/0339741 A1  Oct. 29, 2020

(30) Foreign Application Priority Data
Dec. 22, 2017 (FR) .................... 1763135

(51) Int. Cl.
C08G 61/08 (2006.01)
B01J 31/22 (2006.01)
C08J 5/24 (2006.01)

(52) U.S. Cl.
CPC .......... *C08G 61/08* (2013.01); *B01J 31/2278* (2013.01); *C08J 5/24* (2013.01); *B01J 2231/543* (2013.01); *B01J 2531/821* (2013.01); *B01J 2540/60* (2013.01); *C08G 2261/3322* (2013.01); *C08G 2261/3323* (2013.01); *C08G 2261/3324* (2013.01); *C08G 2261/3325* (2013.01); *C08G 2261/418* (2013.01); *C08G 2261/58* (2013.01); *C08G 2261/592* (2013.01); *C08G 2261/62* (2013.01)

(58) Field of Classification Search
None
See application file for complete search history.

(56) References Cited

U.S. PATENT DOCUMENTS

| | | |
|---|---|---|
| 2011/0237718 A1 | 9/2011 | Yoshiwara |
| 2014/0323671 A1 | 10/2014 | Olivier-Bourbigou et al. |
| 2015/0315223 A1 | 11/2015 | Mauduit |
| 2017/0306171 A1* | 10/2017 | Vidavsky .............. B29C 64/112 |

FOREIGN PATENT DOCUMENTS

WO  WO 2014/091157  6/2014

OTHER PUBLICATIONS

Dinger, M. B. et al. "Adamantyl-Substituted N-Heterocyclic Carbene Ligands in Second-Generation Grubbs-Type Metathesis Catalysts" *Organometallics*, 2003, pp. 5291-5296, vol. 22, No. 25.
Paradiso, V. et al. "Ruthenium olefin metathesis catalysts featuring unsymmetrical N-heterocyclic carbenes" *Dalton Translations*, 2016, pp. 561-571, vol. 45, No. 2.
Rouen, M. et al. "Cycloalkyl-based unsymmetrical unsaturated ($U_2$)-NHC ligands: flexibility and dissymmetry in ruthenium-catalysed olefin metathesis" *Dalton Translations*, 2014, pp. 7044-7049, vol. 43.
Vougioukalakis, G. C. et al. "Ruthenium-Based Heterocyclic Carbene-Coordinated Olefin Metathesis Catalysts" *Chem. Rev.*, 2010, pp. 1746-1787, vol. 110, No. 3.
Yu, B. et al. "Ruthenium indenylidene complexes bearing N-alkyl/N-mesityl-substituted N-heterocyclic carbene ligands" *Dalton Translations*, 2015, p. 11835-11842, vol. 44, No. 26.
Written Opinion in International Application No. PCT/FR2018/053452, dated May 6, 2019, pp. 1-7.

* cited by examiner

*Primary Examiner* — Fred M Teskin
(74) *Attorney, Agent, or Firm* — Saliwanchik, Lloyd & Eisenschenk

(57) ABSTRACT

The present invention relates to a method for the polymerization of cycloolefins by ring-opening metathesis. The reaction is carried out in the presence of at least one particular catalyst, selected from the ruthenium alkylidene complexes comprising at least one 1-aryl-3-cycloalkyl-imidazolin-2-ylidene ligand and mixtures thereof. The invention also relates to a kit for implementing this method.

17 Claims, No Drawings

METHOD FOR THE POLYMERIZATION OF CYCLOOLEFINS BY MEANS OF RING-OPENING METATHESIS

CROSS-REFERENCE TO RELATED APPLICATION

This application is the U.S. national stage application of International Patent Application No. PCT/FR2018/053452, filed Dec. 20, 2018.

SUBJECT MATTER OF THE INVENTION

The present invention relates to a method for the polymerization of cycloolefins by ring-opening metathesis. The reaction is carried out in the presence of at least one particular catalyst, selected from the ruthenium alkylidene complexes comprising at least one 1-aryl-3-cycloalkyl-imidazolin-2-ylidene ligand and mixtures thereof. The invention also relates to a kit for implementing this method.

BACKGROUND OF THE INVENTION

Polydicyclopentadiene or p-DCPD is a polyolefin that is valued for its light weight, rigidity and properties of impact strength, corrosion resistance and resistance to deformation at high temperature. It is mainly used in the manufacture of parts with large dimensions such as body elements for tractors, buses or trucks.

p-DCPD is generally obtained by ring-opening metathesis of DCPD (or ROMP for "Ring-Opening Metathesis Polymerization"), followed by crosslinking, leading to the following product:

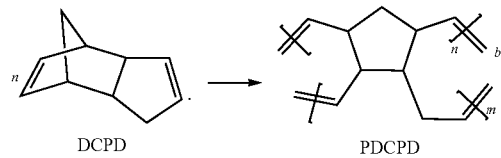

This transformation is generally carried out in a mold by the so-called reaction injection molding (RIM) technique.

The metathesis reaction is usually carried out in the presence of catalysts based on tungsten, molybdenum or ruthenium. However, as the tungsten-based and molybdenum-based catalysts are very sensitive to moisture, those based on ruthenium are preferred.

Among the ruthenium-based catalysts used for the polymerization of cycloolefins, we may notably mention those of formula (I):

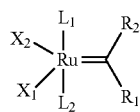

where for example: X1=X2=Cl; R1=phenyl; R2=H; L1 and L2 denote a ligand of the unsaturated nitrogen-containing heterocyclic carbene type or NHC (for "N-Heterocyclic Carbene") of formula (II):

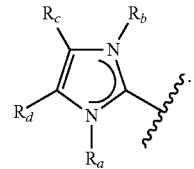

where $R_a=R_b$=isopropyl or cyclohexyl and $R_c=R_d$=H, as described in U.S. Pat. No. 7,652,145. Other catalysts of formula (I) but comprising phosphines, or a phosphine and a saturated NHC, as ligands L1 and L2, notably comprise the Nolan II catalyst of formula:

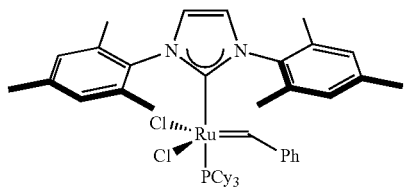

as well as the catalysts described in document WO 00/46255. The Grubbs catalysts of first and second generation, of formula:

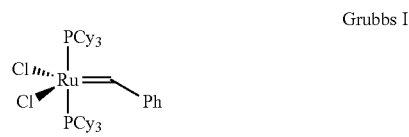

Grubbs I

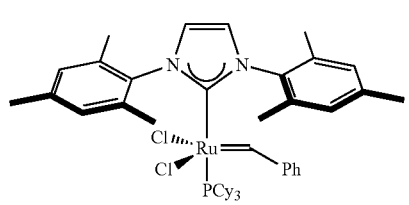

Grubbs II and the catalyst C827, of formula:

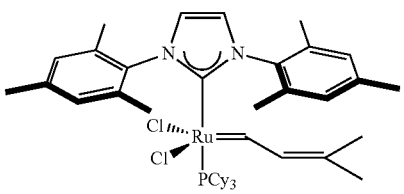

are covered by this definition. Their use in the ring-opening metathesis of cycloolefins is also described in documents U.S. Pat. Nos. 5,342,909 and 6,476,167 (Grubbs I) as well as in U.S. Pat. No. 7,329,758 (Grubbs II and C827).

Moreover, there is a report (F. B. Hamad et al., Olefin Metathesis Ruthenium Catalysts Bearing Unsymmetrical Heterocyclic Carbenes, *Coordination Chemistry Reviews* (2013), dx.doi.org/10.1016/j.ccr.2013.04.015) of the use of several catalysts containing a ligand of the asymmetric NHC type in ring-opening metathesis reactions, in particular the complexes of formula:

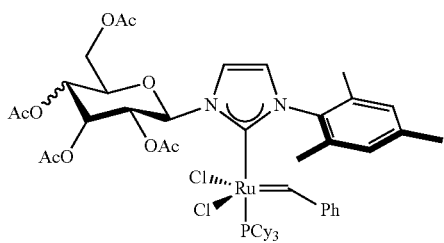

which are considered to be more effective than the Grubbs I catalyst (but less effective than the Grubbs II catalyst) in the polymerization of cyclooctadiene and to have an activity similar to the complex containing a symmetric NHC ligand illustrated above.

Other catalysts comprising an asymmetric NHC ligand have been proposed as metathesis catalysts (WO 2014/091157). However, it has never yet been suggested to use them in the polymerization of cycloolefins by ring-opening metathesis.

The applicant found that the Grubbs II catalyst led to a material having a high compressive strength, which is important for a great many applications, but that it did not allow controlled polymerization of cycloolefins and so resulted in an inhomogeneous polymer material, with bubbles. The other complexes known to date as catalysts of ring-opening metathesis of cycloolefins do not have the same drawbacks, but the compressive strength of the materials obtained is inadequate. Furthermore, for some of these complexes an organic solvent, whose environmental impact we are seeking to reduce, has to be added to the reaction mixture. Moreover, incomplete dissolution of the catalyst in the reaction mixture also leads to an inhomogeneous material, having grains that are potential weak points for the material formed.

Therefore there is still need for a method of metathesis of cycloolefins that leads to a material having a better compromise of properties (surface appearance and compressive strength) than the ruthenium complexes known for this purpose.

It would also be useful to have a catalytic system allowing better control of polymerization than some of the catalysts of the prior art that lead to excessively rapid polymerization, leading to a large increase in the viscosity of the reaction mixture even before it is introduced into the mold, or before filling of the mold or else before the catalyst is properly dispersed in the resin. This control is particularly critical in the manufacture of large moldings.

It would moreover be useful to have a method of metathesis of cycloolefins that is more environmentally friendly, in the sense that it requires no, or less, organic solvent in the reaction mixture.

SUMMARY OF THE INVENTION

The applicant has demonstrated that ruthenium alkylidene complexes comprising at least one 1-aryl-3-cycloalkyl-imidazolin-2-ylidene ligand led, by ring-opening metathesis of cycloolefins, to a material having a high compressive strength, similar to that of the materials obtained in the same conditions using the Grubbs II catalyst, i.e. varying by less than 5% from the value measured for these materials, measurement being carried out according to standard D695-15.

Furthermore, these catalysts are sufficiently soluble in the cycloolefins so that it is not necessarily useful to add an organic solvent to the reaction mixture in order to prevent the formation of grains or bubbles in the material. The absence of organic solvent, or use thereof in a smaller amount, reduces not only the environmental impact of the method but also its cost, which is moreover lowered by using catalysts that cost less to prepare than certain other ruthenium complexes.

Finally, these catalysts make it possible to control the metathesis reaction and thus obtain a material with a homogeneous appearance.

The invention thus relates to a method for the polymerization of cycloolefins by ring-opening metathesis, comprising contacting at least one cycloolefin, optionally functionalized, with at least one metathesis catalyst selected from the ruthenium alkylidene complexes comprising at least one 1-aryl-3-cycloalkyl-imidazolin-2-ylidene ligand, in effective conditions for polymerizing said at least one cycloolefin.

It also relates to a kit for implementing the above method, characterized in that it contains a composition containing said at least one catalyst in encapsulated form, dispersed in said at least one cycloolefin, or two separate compositions, one of which contains said at least one catalyst and the other contains said at least one cycloolefin.

The invention also relates to the use of a catalyst as defined above for the polymerization of at least one cycloolefin, optionally functionalized, by ring-opening metathesis.

Besides the aforementioned advantages, the catalysts used in the method according to the invention allow adequate control of the polymerization reaction. Furthermore, they are not sensitive to moisture and are not liable to be poisoned by the impurities present in commercial cycloolefins, so it is possible to use less pure grades of the latter.

DETAILED DESCRIPTION

Definitions

"Halogen" means fluorine, chlorine, bromine or iodine.

"Cycloalkyl" means a cyclic aliphatic hydrocarbon group, which may be monocyclic or polycyclic. When the group is polycyclic, i.e. when it comprises more than one ring, the rings may advantageously be condensed in pairs or joined together in pairs by bonds. The cycloalkyl group is for example a monocyclic hydrocarbon group having a number of carbon atoms greater than 2, preferably from 3 to 24, more preferably from 4 to 12, preferably a cyclopentyl, cyclohexyl, cycloheptyl, cyclooctyl or cyclododecyl group, or a polycyclic (bi- or tricyclic) group having a number of carbon atoms greater than 3, preferably from 6 to 18, such as for example the adamantyl, norbornyl or isopinocampheyl groups.

"Alkyl" means a linear or branched, saturated alicyclic hydrocarbon group containing from 1 to 12 carbon atoms, notably a methyl, ethyl, isobutyl, octyl or dodecyl group. The alkyl group preferably has from 1 to 10 carbon atoms, and even more preferably from 1 to 4 carbon atoms. Examples of preferred alkyl groups are notably the methyl, ethyl, propyl, isopropyl, butyl, isobutyl and tert-butyl groups.

"Heteroalkyl" group means a linear or branched hydrocarbon-containing chain having from 2 to 15 carbon atoms interrupted by one or more heteroatoms such as N, S or O. The heteroalkyl group may in particular be selected from the polyalkylene-oxy groups, the alkoxy groups and the alkylamino groups.

"Alkenyl" means a linear or branched unsaturated alicyclic hydrocarbon group, containing from 2 to 14 carbon atoms, notably an ethenyl, vinyl, isopropenyl or butenyl group.

"Aryl" means a carbocyclic group with 6 to 20 ring members, mono- or polycyclic, containing conjugated double bonds. Examples of aryl groups are phenyl and naphthyl.

"Heteroaryl" means a mono- or polycyclic aromatic group, each ring of which contains from 3 to 6 ring members and of which at least one ring member contains a heteroatom, notably a thiophenyl, pyridinyl, pyrrolyl, furanyl, indolyl, thiophenyl, benzofuranyl, benzothiophenyl, imidazolyl, oxazolyl, thiazolyl, pyrazolyl, isoxazolyl, isothiazolyl, quinolinyl, isoquinolinyl group.

"Carbocycle" means a mono- or polycyclic hydrocarbon group, optionally unsaturated, aliphatic or aromatic, containing from 5 to 20 carbon atoms, in particular an indenyl group.

The method according to the invention is a method called ring-opening metathesis polymerization (ROMP), which consists of contacting at least one cycloolefin, optionally functionalized, with at least one particular metathesis catalyst, in effective conditions for polymerizing said at least one cycloolefin.

"Cycloolefins" means monocyclic or polycyclic compounds, optionally bridged, having at least one carbon-carbon double bond. The cycloolefin is advantageously selected from the bridged cycloalkenes, the nonbridged cycloalkenes, oligomers thereof and mixtures thereof. The bridged cycloalkenes are generally the reaction products of cyclopentadiene with a dienophile, such as dicyclopentadiene, norbornene, norbornadiene and dicarboxylic norbornene anhydride. The nonbridged cycloalkenes may notably be selected from cyclohexene, cycloheptene, cyclooctene, cyclododecene and cyclooctadiene. Dicyclopentadiene or oligomers thereof or mixtures thereof with at least one of the other aforementioned cycloolefins are preferably used.

Hereinafter, the expression "dicyclopentadiene" or "DCPD" denotes both dicyclopentadiene and its oligomers, unless stated otherwise, it being understood that monomeric dicyclopentadiene is preferred for use in the present invention. The oligomers of DCPD correspond to the following formulas:

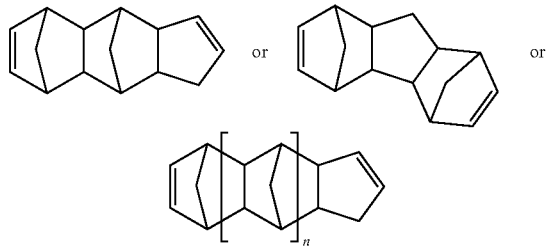

in which n is in the range from 1 to 20, preferably from 1 to 10. They notably comprise tricyclopentadiene and tetracyclopentadiene.

The mixtures of cycloolefins make it possible to adjust the properties of the material. When DCPD is mixed with another cycloolefin, the molar ratio of DCPD to this other cycloolefin may be for example between 1:1 and 1000:1, for example between 2:1 and 50:1, more particularly between 8:1 and 15:1.

The cycloolefin used according to the invention may optionally be functionalized. "Functionalized" means that one or more of the hydrogen atoms of the cycloolefin is (or are independently of one another) replaced with a group selected from: an alkyl group, notably methyl, ethyl, isobutyl, octyl or dodecyl; a linear or branched alkenyl group, notably a vinyl, isopropenyl or butenyl group; a group —COOR$^5$ where R$^5$ is H or alkyl, notably methoxycarbonyl; a group —OR$^6$ or —CH$_2$OR$^6$ where R$^6$ is H or alkyl; an aryl group, preferably phenyl; a group —COR$^7$ where R$^7$ is H or alkyl, notably acetyl; and a cyano group. Examples of functionalized cycloolefins are DCPD-OH and ethylidene norbornene.

Hereinafter, the term "cycloolefin" is used for denoting both a functionalized and a nonfunctionalized cycloolefin, it being understood that the use of a nonfunctionalized cycloolefin is preferred. Moreover, this term denotes both a single cycloolefin and a mixture of different cycloolefins. It must therefore be understood as being equivalent to "one or more cycloolefins".

As pointed out above, the cycloolefin is reacted, in the method according to the invention, with at least one ruthenium-based catalyst, namely a ruthenium alkylidene complex comprising at least one 1-aryl-3-cycloalkyl-imidazolin-2-ylidene ligand.

"Ruthenium alkylidene complex" means a penta- or hexa-coordinated ruthenium complex comprising an alkylidene ligand. The ruthenium complex according to the invention further comprises a 1-aryl-3-cycloalkyl-imidazolin-2-ylidene ligand coordinated with the ruthenium atom, the aryl and imidazolinyl groups of which may optionally be substituted. Preferably, moreover, the ruthenium complex does not comprise a bidentate ligand. Its additional ligands may for example be selected from the group consisting of:

uncharged ligands, notably of the phosphorus-containing type such as trialkylphosphines, tricycloalkylphosphines and triarylphosphines, in particular tricyclohexylphosphine or triphenylphosphine, the trialkylphosphites or selected from the 1-aryl-3-cycloalkyl-imidazolinyls, and/or anionic ligands, such as halides, in particular chlorides.

The ruthenium complex may thus comprise two anionic ligands and one or two uncharged ligands, in addition to the alkylidene ligand and 1-aryl-3-cycloalkyl-imidazolin-2-ylidene ligand.

The ruthenium complex used according to the invention preferably corresponds to the following formula (1):

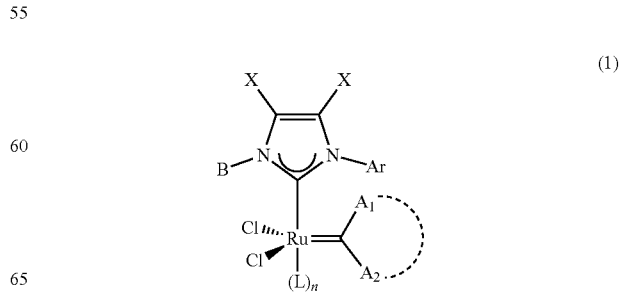

in which:

X denotes a hydrogen or halogen atom or an alkyl or aryl group,

B denotes a cycloalkyl group,

Ar represents an aryl group optionally substituted with at least one substituent selected from: the halogen atoms, and in particular chlorine or fluorine, the trifluoromethyl, nitro, alkyl groups, in particular methyl or isopropyl, heteroalkyl groups (notably alkoxy such as the methoxy group) or alkylammonium and the aryl groups substituted with one or more alkyl groups, such as the tolyl group, L denotes a neutral ligand, A1 represents a hydrogen atom, A2 represents an alkyl or alkenyl group, an aryl group or a heteroaryl group, or else A1 and A2 together form a carbocycle optionally substituted with at least one group selected from the alkyl, heteroalkyl and aryl groups, n has a value of 1 or 2.

In one embodiment of the invention, A2 represents a vinyl, methyl, thiophenyl or phenyl group. In another embodiment, A1 and A2 together form an indenyl group, optionally substituted.

Preferably, the neutral ligand L is selected from a pyridine, a phosphine trisubstituted with groups selected independently from the alkyl, cycloalkyl and aryl groups, a phosphite trisubstituted with groups selected independently from the alkyl, cycloalkyl and aryl groups, or a group (L1):

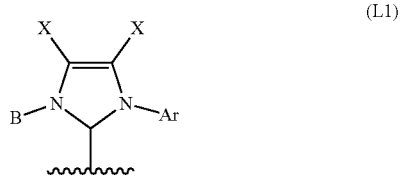

where B, Ar and X are as defined above.

It will be understood that when n has a value of 2, the ligands L may be different from one another or identical to one another. In one embodiment of the invention, n has a value of 1 and L is a phosphine trisubstituted with an alkyl or aryl group, a phosphite trisubstituted with an alkyl or aryl group or a group (L1). In another embodiment, n has a value of 2 and each ligand L is a pyridine.

Preferably, the complex of formula (1) corresponds to one of the following formulas (1a) and (1b):

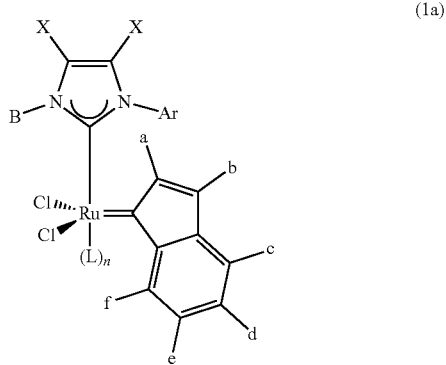

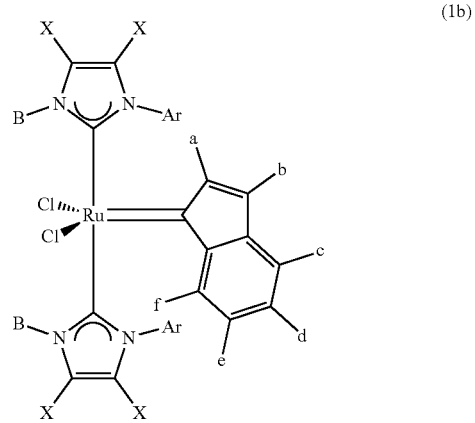

in which B is a cycloalkyl group; Ar is an aryl group, unsubstituted or substituted with at least one group selected from the halogen atoms and the trifluoromethyl, nitro, alkyl, heteroalkyl and aryl groups; the groups X are selected independently from the group consisting of a hydrogen atom, a halogen atom, an aryl group and an alkyl group; L is an uncharged ligand; a, b, c, d, e and f are selected independently of one another from the group consisting of a hydrogen atom, an alkyl group, a heteroalkyl group and a phenyl group; n has a value of 1 or 2.

According to the invention, preferably B is selected from the group consisting of cyclopentyl, cyclohexyl, cycloheptyl, cyclooctyl, cyclodecyl, cyclododecyl and cyclopentadecyl. More preferably, B is cyclohexyl.

Furthermore, preferably Ar is a phenyl group substituted with at least one group selected from the halogen atoms, and in particular chlorine or fluorine, and the trifluoromethyl, nitro, alkyl groups, in particular methyl or isopropyl, and alkoxy. More preferably, Ar is selected from the group consisting of 2,4,6-trimethylphenyl, 2,6-diisopropylphenyl, 2,4,6-tris(trifluoromethyl)phenyl, 2,4,6-trichlorophenyl and hexafluorophenyl. Better still, Ar is 2,4,6-trimethylphenyl, also denoted by "mesityl".

For their part, the groups X preferably each represent a hydrogen atom.

Moreover, preferably, a, c, d, e and f represent a hydrogen atom and b represents a phenyl group.

In one embodiment, L is a phosphorus-containing ligand, in particular of formula $P(R^8)_3$, in which P is a phosphorus atom and $R^8$ is selected from the groups $R^9$ and $(OR^9)$ in which the groups $R^9$ are identical or different and are selected from the hydrogen, halide, alkyl, cycloalkyl, aryl and aralkyl groups, substituted or unsubstituted, each of the groups comprising up to 20 carbon atoms, and the substituents of said groups being selected from the halides, the alkyl groups and the aryl groups having up to 20 carbon atoms. The aforementioned alkyl, aryl and cycloalkyl groups are as defined above. Very preferably, L is a triaryl or a trialkyl or a tricycloalkyl phosphine. An example of trialkyl phosphine is triisopropylphosphine. The tricycloalkyl phosphine may in particular be selected from the tricyclohexylphosphines and the tricyclopentylphosphines. The triaryl phosphine may notably be selected from triphenylphosphine, tri(methylphenyl)phosphine, trimesitylphosphine, tri(dimethylphenyl) phosphine and tri[(trifluoromethyl)phenyl]phosphine. As a variant, the ligand L may be a dialkyl or a dicycloalkyl phosphine selected for example from dicyclohexylphosphines, di-tert-butylphosphines, di-tert-butylchlorophosphines and 2-isobutyl-2-phospha-bicyclo-[3.3.1]nonane. Very preferably, L is a tricyclohexylphosphine group.
It will be understood that when n has a value of 2, the ligands L may be different from one another or identical to one another. Preferably, n has a value of 1.
Preferred examples of catalysts that may be used according to the invention are illustrated below.
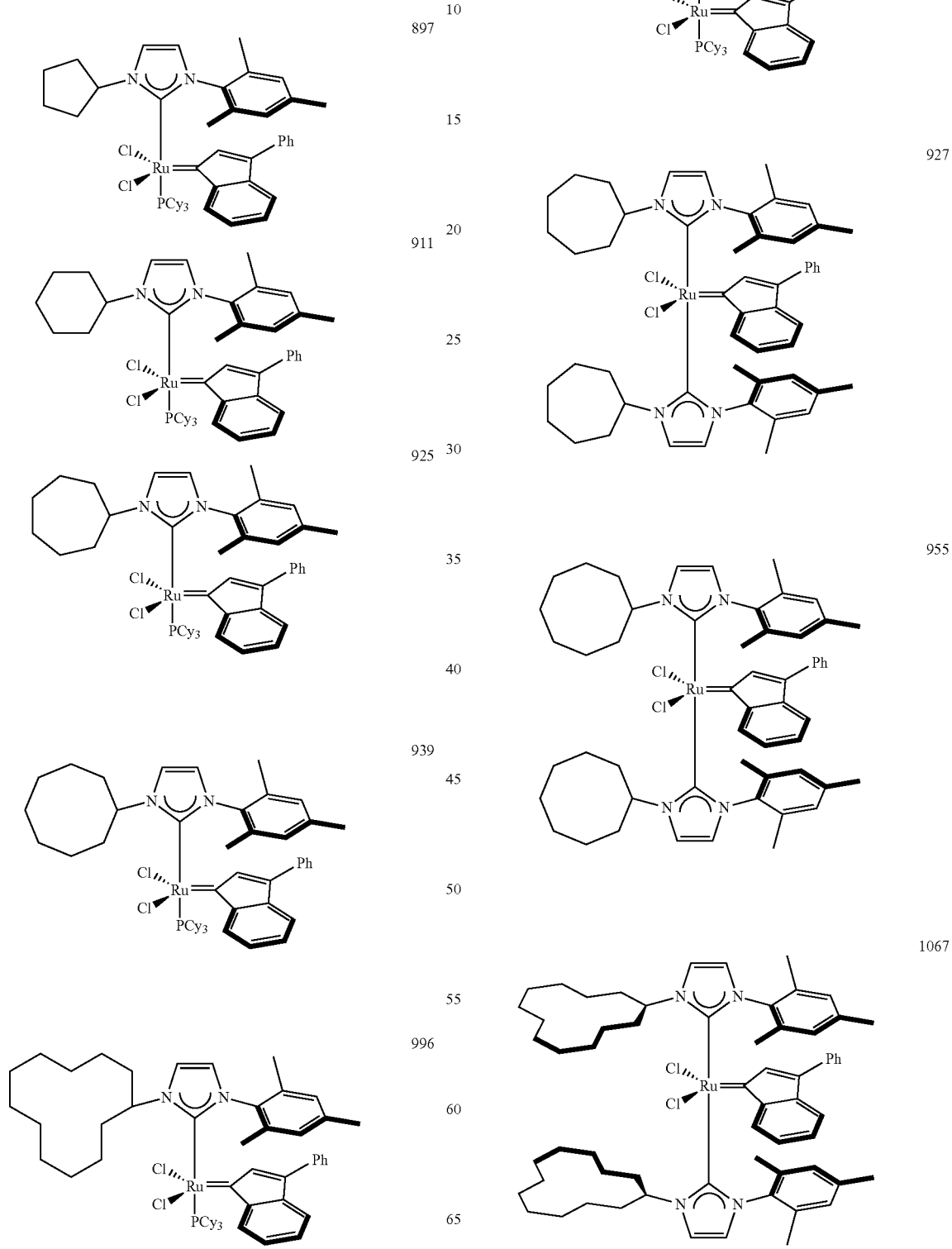

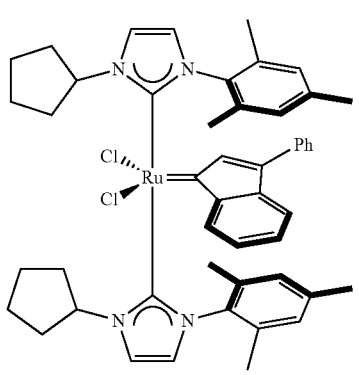
870

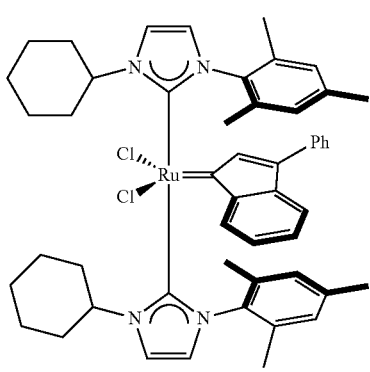
899

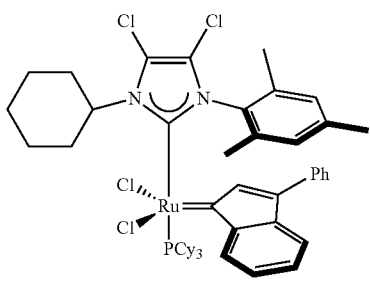
979

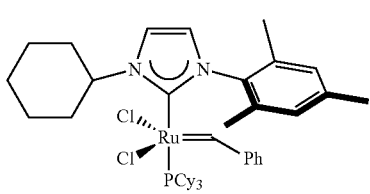
791

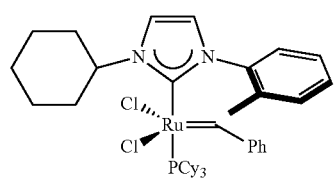
763

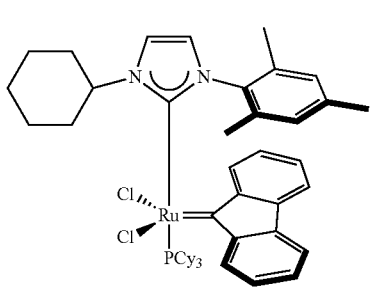
885

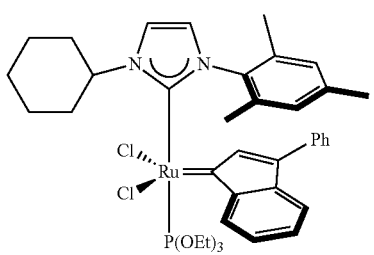
795

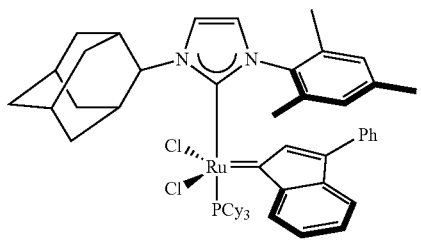
962

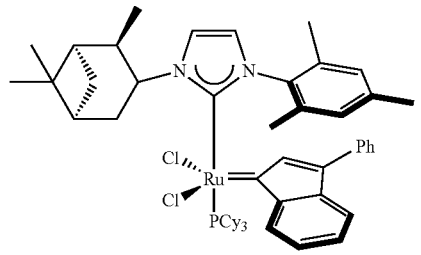
964

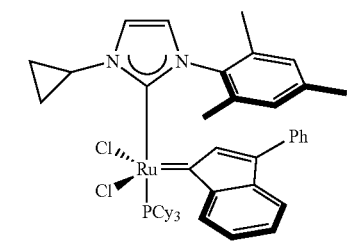
867 where: PCy3 denotes a tricyclohexylphosphine group, Ph denotes a phenyl group, iPr denotes an isopropyl group.

The ruthenium complex used according to the invention may notably be prepared by the method described in patent application WO2014/091157, starting from a 1,3-disubstituted imidazolium salt and a ruthenium complex precursor, such as the complex M1 shown below. The ruthenium complex precursor may also be the complex M10 shown below.

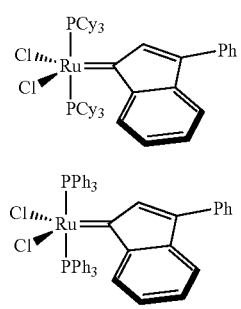

In a preferred embodiment of the invention, the method of metathesis is carried out in the presence of a complex of formula (1b), alone or mixed with a complex of formula (1a) preferably having the same groups Ar, B and X. The molar ratio of the complex of formula (1a) to the complex of formula (1b) is advantageously between 99:1 and 1:99, and preferably between 5:95 and 95:5. Better still, the molar ratio of the complex of formula (1a) to the complex of formula (1b) is between 30:70 and 70:30.

In the case when a catalyst of formula (1b) is used, alone or mixed with a catalyst of formula (1a), the method according to the invention further comprises a step of activation of these latent catalysts of formula (1b) of the bis-NHC type. Activation may be effected either thermally, by heating to a temperature in the range from 40 to 120° C., or by adding an activator to the reaction mixture. Various activators may be used, such as Lewis acids, notably the halides of copper(I) or of aluminum or the compounds of formula $ZnR_2$, $SnR_2$, $SnR_4$ and $SiR_4$ where the groups R denote, independently of one another, a halogen atom or an alkyl, cycloalkyl, alkenyl, phenyl or benzyl group, as defined above; the Brønsted acids such as organic or inorganic acids, notably hydrochloric acid, hydrobromic acid, iodic acid, hydrofluoric acid, sulfuric acid, nitric acid, periodic acid, the sulfonic acids such as methanesulfonic acid, the mono- and polycarboxylic acids, as well as acidic resins. It is also possible to combine several of these modes of activation, for example heating the catalyst in an acid medium.

It was observed that the catalysts of formula (1a) and (1b) allowed the method according to the invention to be carried out in an open mold. Combining the catalysts of formulas (1a) and (1b) makes it possible to benefit from the stability of one and the reactivity of the other to obtain a synergistic mixture.

Hereinafter, "catalyst" will denote both a single ruthenium complex and a mixture of ruthenium complexes as described above.

In the method according to the invention, the total amount of catalyst relative to the cycloolefin, expressed in moles, may be for example between 10 and 1000 ppm, preferably between 30 and 500 ppm.

The method of metathesis according to the invention may be carried out in the absence or in the presence of a solvent, which may be any organic solvent such as aliphatic hydrocarbons, in particular n-hexane and liquid paraffin; alicyclic hydrocarbons, such as cyclohexane or dimethylcyclohexane; aromatic hydrocarbons such as benzene, toluene and xylene; azotized compounds such as acetonitrile; the oxygenated compounds, in particular the ketones such as acetone, the ethers such as diethyl ether, the esters such as ethyl acetate and the oxygenated heterocycles such as tetrahydrofuran; the halogenated compounds such as dichloromethane; and mixtures thereof. This method is preferably carried out in the absence of solvent.

The method according to the invention is advantageously carried out at atmospheric pressure. Contacting of the catalyst with the cycloolefin is generally effected with stirring until a homogeneous mixture is obtained, which is then heated. A wide range of temperatures may be used for this purpose. The reaction may thus be carried out at a temperature from 20 to 120° C., preferably from 40 to 100° C., for a time from about 1 minute to 16 h. Optionally, the reaction mixture may first be heated at 40-60° C. for 1 to 20 minutes, then the temperature may be raised to 80-100° C. and maintained at the selected value for 1 minute to 16 h.

The metathesis reaction may be carried out in a mold heated to the aforementioned temperatures, by a method of reaction injection molding (RIM) or resin transfer molding (RTM), optionally under vacuum. When the reaction mixture comprises an acid activator, the latter may be introduced into the mold after pouring in the catalyst and the cycloolefin and before heating the mold. As a variant, the activator may be mixed with the cycloolefin and with the catalyst before introducing this mixture into the mold. When activation is carried out by means of an acidic resin, the mixture of the catalyst and the cycloolefin is generally passed over this resin before it is poured into the mold. As a variant, the metathesis reaction may be carried out after infusion of the mixture of the cycloolefin and catalyst in a fibrous preform.

In one embodiment, the method according to the invention may be carried out in the presence of at least one chain transfer agent, such as hex-1-ene, oct-1-ene, vinyl-4-cyclohexene, methyl oleate, pentaphenylethane, carbon tetrachloride, bromotrichloromethane, dodecane-1-thiol, tert-nonanethiol, 4-methylbenzenethiol or 1,8-dimercapto-3,6-dioxaoctane or else the reaction product of a C4-C10 diol with ethylene oxide or propylene oxide and/or a crosslinking agent such as an organic peroxide.

As a variant or in addition, the method according to the invention may be carried out in the presence of one or more additives or aids, notably organic and/or inorganic fillers; reinforcements; plasticizers; pigments and/or dyes; antioxidants; surfactants or amphiphilic polymers; flame retardants; UV absorbers; light stabilizers; impact modifiers; antistatic agents; release agents; lubricants; swelling agents; fungicides; and mixtures thereof.

Examples of fillers are notably those intended to adjust the density, the mechanical properties and/or the glass transition temperature of the polymer obtained at the end of the method according to the invention. They may be fibers, powders, granules, beads, microspheres and particles of any shape based on glass, metal oxides, metal carbides, metal nitrides, ceramic, fly-ash, or else thermoplastic or thermosetting polymer or elastomer. These fillers may optionally be coated to improve their compatibility with the cycloolefin. They may represent from 1 to 200 wt %, relative to the weight of the cycloolefin.

The fillers described above may notably be used for making syntactic foams. In this case, macro-elements of any shape are generally used as fillers, such as macrospheres, generally hollow and based on thermosetting resin, thermoplastic resin, ceramic or steel, or glass microbeads. The fillers usable in the manufacture of syntactic foams generally have a density in the range from 0.1 to 0.7.

In a first embodiment, the method according to the invention comprises contacting and mixing a first composition containing the catalyst with a second composition containing the cycloolefin, in conditions for directly obtaining an object of the desired shape, for example in a mold or on a preform.

The additives described above may be added indifferently to the first or the second composition, although preferably they are present in the second composition. The chain transfer agents and/or the crosslinking agents optionally used are advantageously present in the second composition.

In this first embodiment, the first composition may consist of the catalyst, which is generally in the form of powder, or it may comprise said catalyst in at least one solvent. This solvent may consist of one or more organic solvents, such as those described above, and/or water. One or more surfactants or amphiphilic polymers may optionally be present in the composition, notably for promoting the formation of an emulsion and/or dispersing the fillers optionally present in the first composition or brought into contact with the latter during mixing of the two compositions.

In this embodiment, the first and the second composition are advantageously mixed in a volume ratio between 50:50 and 99.8:0.2.

In a second embodiment, the catalyst and the cycloolefin are present in the same composition and the catalyst is encapsulated. Supply of mechanical and/or thermal energy is then necessary to release the catalyst and allow it to react with the cycloolefin in conditions for directly obtaining an object of the desired shape, for example in a mold or on a preform.

In this second embodiment, the catalyst may be contained in solid capsules, dispersed in said at least one cycloolefin or a composition comprising said at least one cycloolefin. The method of encapsulation advantageously comprises a first step consisting of adding, while stirring, a composition C1 comprising the catalyst, to a liquid composition C2 either comprising a thermo-expandable material, or polymerizable, the compositions C1 and C2 not being miscible with one another. In the case when composition C2 comprises a thermo-expandable material, the emulsion obtained in the first step is then added, with stirring, to a polymerizable liquid composition C3, the compositions C2 and C3 not being miscible with one another, then the emulsion thus obtained is introduced, with stirring, into a liquid composition C4, comprising said at least one cycloolefin, the compositions C3 and C4 not being miscible with one another. In the case when composition C2 is polymerizable, the first step above is followed by adding the emulsion, with stirring, to a liquid composition C3' comprising said at least one cycloolefin, C2 and C3' not being miscible, then the emulsion thus obtained is loaded into a mixer, which subjects it to shearing at a speed between 1000 and 100 000 $s^{-1}$. This step makes it possible to fragment the polydisperse population of droplets into a monodisperse population of double droplets. In all cases, whatever the composition C2, the method is followed by a step of polymerization of the droplets obtained. Solid capsules containing the catalyst are thus obtained, dispersed in a composition comprising the cycloolefin. Such capsules may notably be prepared by the methods described in patent applications WO 2016/120308 and WO 2017/046360.

Release of the catalyst contained in the solid capsules is initiated in the first case by a temperature rise, which leads to expansion of the thermo-expandable material of the composition C2, causing rupture of the polymerized rigid envelope of the capsules, and in the second case by mechanical shearing applied to the composition comprising the solid capsules.

It should be noted that, in one or other of the above embodiments, the fillers optionally used in the method according to the invention may as a variant be present in the mold in which this method is carried out. This variant is preferred in the case of fillers of the macrosphere or fiber type, used in particular in the manufacture of syntactic foams.

More generally, in the case of fibers, the fibers may be arranged in the form of a mat or fabric, the method comprising in this case a step consisting of impregnating the fibers, before polymerization, using the mixture of said at least one cycloolefin with said at least one metathesis catalyst.

The invention also relates to a single-component or multicomponent kit for implementing the method according to the invention. This kit contains either a composition containing said at least one catalyst in encapsulated form, dispersed in said at least one cycloolefin, or two separate compositions, one of which contains said at least one catalyst and the other contains said at least one cycloolefin.

As pointed out above, the aforementioned crosslinking agents, chain transfer agents and additives may be present, independently of one another, in one and/or other of the compositions of the kit.

The method as well as the kit according to the invention may be useful in the manufacture of body parts of terrestrial vehicles (in particular tractors, trucks and buses), nautical or aerospace vehicles, blades of wind turbines, sports articles (such as golf clubs), offshore installations (notably buoys and pipelines), containers for the chemical industry, water treatment equipment, camping equipment, bulletproof vests, electromagnetic shields, this list not being exhaustive. As a variant, the kit according to the invention may be used for repairing cracks in masonry structures, notably in concrete, stone or brick.

EXAMPLES

The invention will be better understood from the following examples, which are given purely for purposes of illustration and do not aim to limit the scope of the invention, which is defined by the accompanying claims.

Solvents and Reagents:

Toluene is distilled over sodium benzophenone and degassed before being used. The other commercial products are used without prior purification. The ruthenium complexes are supplied by Umicore, Strem Chemicals Inc., or are prepared in accordance with the procedures described in the literature.

The asymmetric imidazolium salts are prepared using the procedures described in the literature (Mauduit, et al. *Angew. Chem. Int. Ed.* 2013, 52, 14103-14107; Mauduit, et al. *ACS Catal.* 2016, 6, 7970-7976). The asymmetric complex comprising a glycoside group on the diaminocarbene is prepared following the procedure described in the literature (Grubbs, et al. *Organometallics* 2010, 29, 403-408).

Ultrene 99-6 is sold by the company Cymetech and consists of 94% of DCPD and 6 wt % of Tri-CPD.

Ethanox 4702 is sold by the company SI Group.

Chromatography:

Analytical thin-layer chromatography was carried out on Merck $60F_{254}$ plates, of silica-coated aluminum, using UV light at 254 nm or a solution of $KMnO_4$ at 3% as developer. The purifications by column chromatography were carried out with Merck 9385 silica gel (230-400 mesh).

The catalysts presented below were used in the examples given hereunder.

Catalysts of Formula (1a):

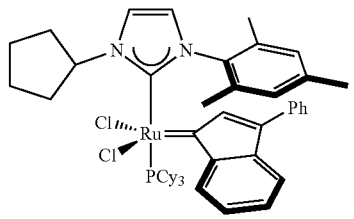
IMesC5

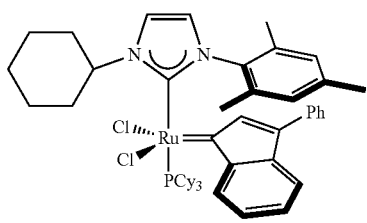
IMesC6

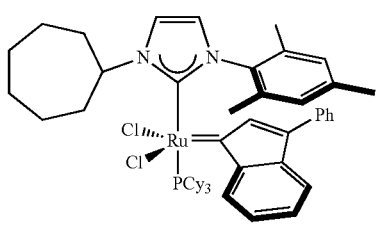
IMesC7

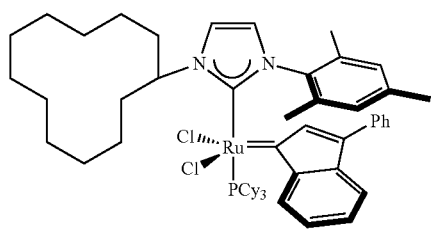
IMesC12

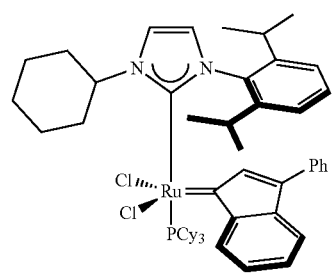
IPrC6

Catalysts of Formula (1b):

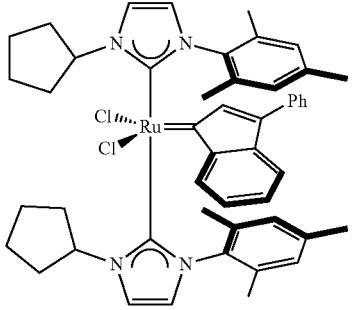
BisC5

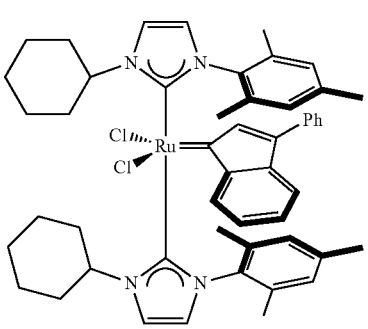
BisC6

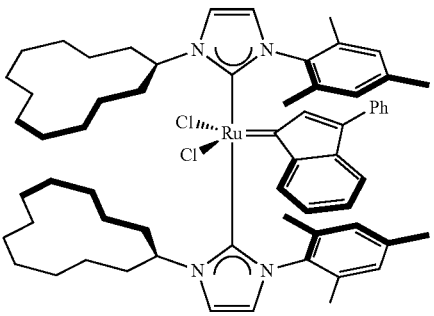
BisC12

Example 1: Synthesis of the Catalysts

The catalysts used in the method according to the invention are prepared as follows, either starting from precursor M1 or from precursor M10, shown below:

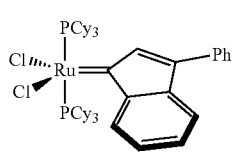
M1

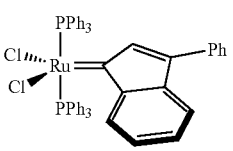
M10

1-1: Catalysts of Formula (1a)

The imidazolium (1.2 mmol, 1.2 eq.) is weighed in a Schlenk flask inside a glove box and then 6.3 mL of toluene is added followed by 0.70 mL of tert-potassium amylate (1.2 mmol, 1.2 eq.). The mixture is then stirred for 30 minutes and then 0.923 g (1 mmol, 1 eq.) of M1 is added in one go. The Schlenk flask is then closed, and is then kept at 80° C. outside of the glove box. After reaction for 2 h, the reaction mixture is concentrated under vacuum and then purified on a silica gel column.

1-2: Catalysts of Formula (1b)

The imidazolium (3 mmol, 3 eq.) is weighed in a Schlenk flask in a glove box and then 1 mL of toluene is added followed by 6 mL of potassium hexamethyldisilazane (0.5 M, 3 mmol, 3 eq.). The mixture is then stirred for 30 minutes and then 0.92 g of M1 (1.0 mmol, 1 eq.) is added in one go. The Schlenk flask is then closed, and is then kept at 40° C. outside of the glove box. After reaction for 2 h, the reaction mixture is concentrated under vacuum and then purified on a silica gel column.

Example 2: Polymerization of Dicyclopentadiene (DCPD)

2-1: Thermally Activated Catalysts of the Bis-NHC Type (1b)

24.0 mg (0.022 mmol, 100 ppm) of BisC12 is added to 30 mL of DCPD (223 mmol, 1 eq.).

The mixture is stirred until homogenized and then 10 mL of solution is introduced into a mold. The mixture is heated at 100° C. for 60 minutes. After it returns to room temperature, a rigid material is obtained.

The same method is repeated using 6.0 mg (0.0056 mmol, 25 ppm) of BisC12. A rigid material is obtained.

2-2: Catalysts of the bis-NHC type activated by an acid

A) 24.0 mg (0.022 mmol, 50 ppm) of BisC12 is added to 60 mL of DCPD (447 mmol, 1 eq.). The mixture is stirred until homogenized and then 30 mL of solution is introduced into a mold. A solution of hydrochloric acid in diethyl ether (1 M, 0.5 mL, 0.5 mmol) is added and the mixture is heated at 80° C. for 30 minutes. After it returns to room temperature, a rigid strip is obtained.

B) 24.0 mg (0.022 mmol, 100 ppm) of BisC12 is added to 30 mL of DCPD (223 mmol, 1 eq.). The mixture is stirred until homogenized and then passed through a syringe comprising previously activated Amberlyst 15®. 30 mL of solution is introduced into a mold and then heated at 80° C. for 30 minutes. After it returns to room temperature, a rigid strip is obtained.

C) 14.7 mg (0.017 mmol, 50 ppm) of BisC5 is added to 45 mL of DCPD (332 mmol, 1 eq.). The mixture is stirred until homogenized and then 30 mL of solution is introduced into a mold. A solution of hydrochloric acid in diethyl ether (1 M, 0.38 mL, 0.38 mmol) is added and the mixture is heated at 80° C. for 30 minutes. After it returns to room temperature, a rigid strip is obtained.

2-3: Catalysts of the mono-NHC type (1a)

A) 10.0 mg (0.011 mmol, 50 ppm) of IMesC5 is added to 30 mL of DCPD (29.58 g, 223 mmol, 1 eq.). The mixture is stirred until homogenized, it is introduced into a mold and then heated at 80° C. for 10 minutes. After it returns to room temperature, a translucent rigid strip is obtained.

B) 10.3 mg (0.011 mmol, 50 ppm) of IMesC7 is added to 30 mL of DCPD (29.58 g, 223 mmol, 1 eq.). The mixture is stirred until homogenized, it is introduced into a mold and then heated at 80° C. for 10 minutes. After it returns to room temperature, a translucent rigid strip is obtained.

Example 3: Polymerization of Mixtures of Cycloolefins 3-1: DCPD/Cyclooctene 3.5 mL of cyclooctene (2.968 g, 26.9 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. The mixture is stirred until homogenized and then introduced into a mold. A solution of hydrochloric acid in diethyl ether (1 M, 0.38 mL, 0.38 mmol) is added and the mixture is heated at 80° C. for 30 minutes. After it returns to room temperature, a translucent rigid strip is obtained.

3-2: DCPD/norbornene 2.33 g of norbornene (24.7 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. The mixture is stirred until homogenized and then introduced into a mold. A solution of hydrochloric acid in diethyl ether (1 M, 0.38 mL, 0.38 mmol) is added and the mixture is heated at 80° C. for 30 minutes. After it returns to room temperature, a translucent rigid strip is obtained.

3-3: DCPD/Norbornadiene 3.2 mL of norbornadiene (2.899 g, 31.4 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. The mixture is stirred until homogenized and then introduced into a mold. A solution of hydrochloric acid in diethyl ether (1 M, 0.38 mL, 0.38 mmol) is added and the mixture is heated at 80° C. for 30 minutes. After it returns to room temperature, a translucent rigid strip is obtained.

3-4: DCPD/Cyclooctadiene 3.3 mL of cyclo-octa-1,5-diene (2.910 g, 26.9 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. The mixture is stirred until homogenized and then introduced into a mold. A solution of hydrochloric acid in diethyl ether (1 M, 0.38 mL, 0.38 mmol) is added and the mixture is heated at 80° C. for 30 minutes. After it returns to room temperature, a rigid material is obtained.

3-5: DCPD/Cyclohexene

A) 3.6 mL of cyclohexene (2.920 g, 35.5 mmol) is added to 30 mL of DCPD (29.58 g, 223 mmol, 1 eq.). The mixture is stirred for 10 minutes so as to obtain a homogeneous mixture and then 10.5 mg (0.011 mmol, 50 ppm) of IPrC6 dissolved in 100 μL of dichloromethane is added to 30 mL of this solution. The mixture is stirred until homogenized, and then introduced into a test specimen mold preheated to 60° C. The whole is heated at 60° C. for 10 minutes and then at 80° C. for 16 h. After it returns to room temperature, a rigid translucent test specimen is obtained.

B) 3.6 mL of cyclohexene (2.920 g, 35.5 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. The mixture is stirred until homogenized and then introduced into a mold. A solution of hydrochloric acid in diethyl ether (1 M, 0.38 mL, 0.38 mmol) is added and the mixture is heated at 80° C. for 30 minutes. After it returns to room temperature, a rigid material is obtained.

3-6: Functionalized DCPD/Norbornene 3.3 mL of 5-ethylidene-2-norbornene (2.947 g, 24.5 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. The mixture is stirred until homogenized and then introduced into a mold. A solution of hydrochloric acid in diethyl ether (1 M, 0.38 mL, 0.38 mmol) is added and the mixture is heated at 80° C. for 30 minutes. After it returns to room temperature, a rigid material is obtained.

3-7: DCPD/Trivinylcyclohexane 3.5 mL of 1,2,4-trivinylcyclohexane (2.926 g, 18.0 mmol) is added to 30 mL of DCPD (29.58 g, 223 mmol, 1 eq.). The mixture is stirred for 10 minutes so as to obtain a homogeneous mixture and then 10.1 mg (0.011 mmol, 50 ppm) of IMesC6 is added to 30 mL of this solution. The mixture is stirred until homogenized, it is introduced into a mold and then heated at 80° C. for 10 minutes and then at 100° C. for 15 minutes. After it returns to room temperature, a very flexible material is obtained.

Example 4: Polymerization of Mixtures of Cycloolefins in the Presence of Fillers 4-1: Addition of Diatomaceous Earths 3.3 mL of 5-ethylidene-2-norbornene (2.947 g, 24.5 mmol) is added to 30 mL of DCPD (29.58 g, 223 mmol, 1 eq.). The mixture is stirred for 10 minutes so as to obtain a homogeneous mixture and then 10.5 mg (0.011 mmol, 50 ppm) of IMesC6 is added to 30 mL of this solution. The solution is stirred for 5 minutes for complete dissolution of the IMesC6 and 5.05 g of Celite® 545 is added. The mixture is stirred for 16 minutes at room temperature, then the magnetic bar is removed and the mixture is left to polymerize for 1 h00. After mold release, a compact material is obtained.

4-2: Addition of Carbon Black 3.3 mL of 5-ethylidene-2-norbornene (2.947 g, 24.5 mmol) is added to 30 mL of DCPD (29.58 g, 223 mmol, 1 eq.). The mixture is stirred for 10 minutes so as to obtain a homogeneous mixture and then 5.4 mg (0.0059 mmol, 50 ppm) of IMesC6 is added to 15 mL of this solution. The solution is stirred for 5 minutes for complete dissolution of the IMesC6 and 1.502 g of carbon black is added. The mixture is stirred for 5 minutes at room temperature, introduced into a mold and heated at 40° C. for 5 minutes and then at 80° C. for 10 minutes. On return to room temperature, rigid black test specimens are obtained.

4-3: Addition of Dyes

A) 3.3 mL of 5-ethylidene-2-norbornene (2.947 g, 24.5 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. After homogenization of the mixture, 148.6 mg of Basic Green I and 0.1 mL of ethanol are added, mixed and introduced into a mold. A solution of hydrochloric acid in diethyl ether (1 M, 0.38 mL, 0.38 mmol) is added and the mixture is heated at 80° C. for 30 minutes. After it returns to room temperature, a translucent rigid green strip is obtained.

B) 3.3 mL of 5-ethylidene-2-norbornene (2.947 g, 24.5 mmol) is added to 30 mL of DCPD (29.58 g, 223 mmol, 1 eq.). The mixture is stirred for 10 minutes so as to obtain a homogeneous mixture and then 30 mL of this solution is added to 530 mg of universal green dye (Brico Depot). After homogenization of the mixture, 10.3 mg (0.011 mmol, 50 ppm) of IMesC6 is added and the solution is stirred for 2 minutes, and then introduced into a mold and heated at 60° C. for 10 minutes and then at 100° C. for 5 minutes. After mold release, a translucent rigid green disk is obtained.

4-4: Addition of Surfactant 1.65 mL of 5-ethylidene-2-norbornene (1.473 g, 12.25 mmol) is added to 30 mL of DCPD (29.58 g, 223 mmol, 1 eq.). The mixture is stirred for 10 minutes so as to obtain a homogeneous mixture and then 10.4 mg (0.011 mmol, 50 ppm) of IMesC6 is added to 30 mL of this solution. After homogenization of the mixture, 1 mL of Pluronic L121 (average molecular weight 4400) is added, the whole is introduced into a mold and heated at 60° C. for 15 minutes and then at 100° C. for 5 minutes. After it returns to room temperature, an opaque rigid white strip is obtained.

4-5: Addition of an Impact Modifier 6.6 mL of 5-ethylidene-2-norbornene (5.894 g, 49.0 mmol) is added to 60 mL of DCPD (59.16 g, 447 mmol, 1 eq.). The mixture is stirred for 10 minutes so as to obtain a homogeneous mixture and then 1.818 g of polystyrene-block-polybutadiene-block-polystyrene (30% styrene) is added to 45 mL of this solution. Once dissolution is complete, 15.6 mg (0.017 mmol, 50 ppm) of IMesC6 dissolved in 220 µL of dichloromethane is added and the solution is stirred for 2 minutes, and then introduced into a mold and the whole is heated at 60° C. for 1 minute. After stoving at 80° C. overnight, translucent rigid test specimens are obtained.

4-6: Addition of Release Agents

A) 6.6 mL of 5-ethylidene-2-norbornene (5.894 g, 49.0 mmol) is added to 60 mL of DCPD (59.16 g, 447 mmol, 1 eq.). The mixture is stirred for 10 minutes so as to obtain a homogeneous mixture and then 3 mL of hexamethyldisiloxane (2.292 g, 14.1 mmol) is added to 45 mL of this solution. Once dissolution is complete, 16.2 mg (0.017 mmol, 50 ppm) of IMesC6 dissolved in 220 µL of dichloromethane is added and the solution is stirred for 2 minutes, and then introduced into a mold and the whole is heated at 60° C. for 1 minute. After stoving at 80° C. overnight, rigid test specimens are obtained.

B) 6.6 mL of 5-ethylidene-2-norbornene (5.894 g, 49.0 mmol) is added to 60 mL of DCPD (59.16 g, 447 mmol, 1 eq.). The mixture is stirred for 10 minutes so as to obtain a homogeneous mixture and then 2.35 mL of castor oil (2.258 g) is added to 45 mL of this solution. Once dissolution is complete, 15.7 mg (0.017 mmol, 50 ppm) of IMesC6 dissolved in 220 µL of dichloromethane is added and the solution is stirred for 2 minutes, and then introduced into a mold and the whole is heated at 60° C. for 1 minute. After stoving at 80° C. overnight, translucent rigid test specimens are obtained.

4-7: Addition of Mortar 6.6 mL of 5-ethylidene-2-norbornene (5.894 g, 49.0 mmol) is added to 60 mL of DCPD (59.16 g, 447 mmol, 1 eq.). The mixture is stirred for 10 minutes so as to obtain a homogeneous mixture and then 16.1 mg (0.017 mmol, 50 ppm) of IMesC6 dissolved in 220 µL of dichloromethane is added to 45 mL of this solution. After homogenization of the solution, 4.527 g of mortar is added and the solution is stirred for 2 minutes, and then introduced into a mold and the whole is heated at 60° C. for 2 minutes. After mold release, rigid gray test specimens are obtained.

4-8: Addition of Glass Beads 6.6 mL of 5-ethylidene-2-norbornene (5.894 g, 49.0 mmol) is added to 60 mL of DCPD (59.16 g, 447 mmol, 1 eq.). The mixture is stirred for 10 minutes so as to obtain a homogeneous mixture and then 15.9 mg (0.017 mmol, 50 ppm) of IMesC6 dissolved in 220 μL of dichloromethane is added to 45 mL of this solution. After homogenization of the solution, 7.50 g of 3M™ microspheres of type S32® (22.5 mL) is added and the solution is stirred for 2 minutes, and then introduced into a mold and the whole is heated at 60° C. for 2 minutes. After mold release, rigid homogeneous white test specimens are obtained.

4-9: Addition of Polyethylene Fibers 3.3 mL of 5-ethylidene-2-norbornene (2.947 g, 24.5 mmol) is added to 30 mL of DCPD (29.58 g, 223 mmol, 1 eq.). The mixture is stirred for 10 minutes so as to obtain a homogeneous mixture and then 12.0 mg (0.011 mmol, 50 ppm) of BisC12 is added to 30 mL of this solution. After homogenization of the mixture, the latter is poured into a mold filled with fibers of the Spectra® type, then a solution of hydrochloric acid in diethyl ether (1 M, 0.38 mL, 0.38 mmol) is added and the mixture is heated at 80° C. for 30 minutes. After it returns to room temperature, a rigid strip is obtained in which the fibers are embedded in the polymer.

Example 5: Use of a Mixture of Catalysts

5A) A mixture of ImesC12 (28.2 mg, 0.028 mmol) and BisC12 (29.4 mg, 0.0278 mmol) catalysts dissolved in a minimum of dichloromethane is added to 120 mL of a solution of DCPD (139.2 g)/cyclohexene (2.78 g)/BHT (2.85 g).

The mixture is then homogenized and is poured into a mold preheated to 60° C. After polymerization for 5 minutes, the test specimens are removed from the mold and are put in a stove for 18 h at 80° C.

The test specimens obtained have a fine appearance and good rigidity.

5B) A mixture of ImesC6 (30.5 mg, 0.034 mmol) and BisC6 (20.1 mg, 0.023 mmol) catalysts dissolved in a minimum of dichloromethane is added to 120 mL of a solution of DCPD (139.2 g)/cyclohexene (2.78 g)/BHT (2.85 g).

The mixture is then homogenized and is poured into a mold preheated to 60° C. After polymerization for 5 minutes, the test specimens are removed from the mold and are put in a stove for 18 h at 80° C.

The test specimens obtained have a fine appearance and good rigidity.

Example 6: Mechanical Properties

The properties of the materials formed were tested on a Shimadzu tensile tester, and on a dynamic mechanical analyzer (DMA) of type TA DMA Q800.

| Formulation | Young's modulus (GPa) | Tensile strength (MPa) | Elongation max (%) | Tg (° C.) |
|---|---|---|---|---|
| DCPD/TCPD/ENB (73/18/9) | 2.2 | 57 | 5 | 145 |
| DCPD/ENB/Elastomer (86/9/5) | 1.83 | 45 | 5 | 138 |

Example 7: Comparative Study of Solubility

The properties of various catalysts according to the invention as well as of other ruthenium complexes known to be metathesis catalysts (but not necessarily used in ring-opening metathesis of cycloolefins) were evaluated. The protocol followed, and the results obtained, are presented below.

Solubility Test

A liquid mixture of DCPD with 2 wt % of cyclohexene was prepared. 50 ppm (mole basis) of catalyst was added to 20 mL of this mixture, and then the whole was stirred at room temperature. We then observed the appearance of the composition.

The results of the above tests are presented in the following table.

| Catalyst | Solubility |
|---|---|
| Grubbs II (Materia): 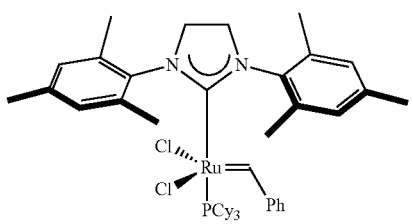 | Soluble |
| C827 (Materia): 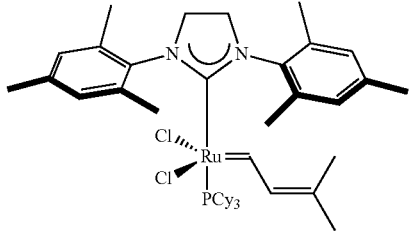 | Very slightly soluble |
| M2 (Umicore): 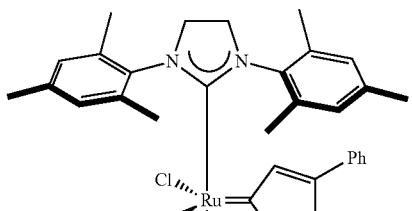 | Partial |
| CatMetium RF1 (Evonik): 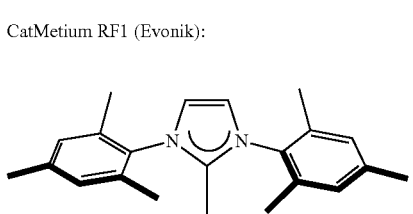 | Partial |

| Catalyst | Solubility |
|---|---|
| IMes glucose: 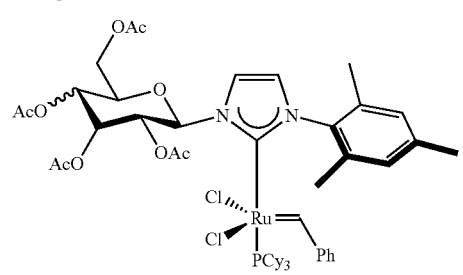 | Soluble |
| IMesC5 (DEMETA): 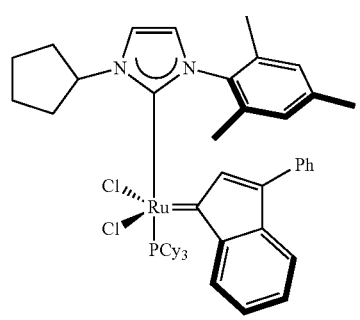 | Partial |
| BisC6 (DEMETA): 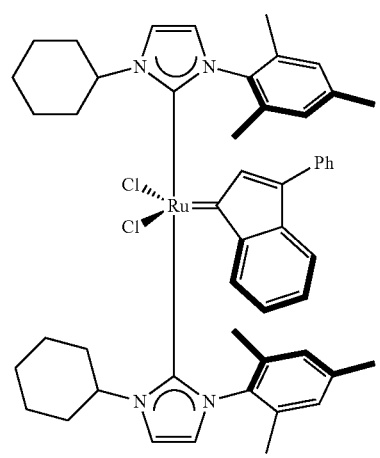 | Soluble |
| Catalyst | Solubility |
|---|---|
| BisC12 (DEMETA): 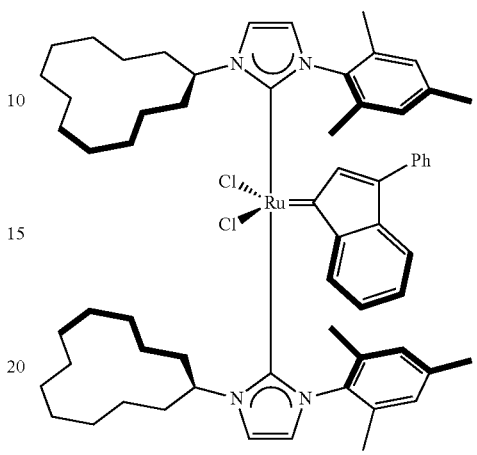 | Soluble |
| Mixture IMesC12 and BisC12 (1:1) (DEMETA) 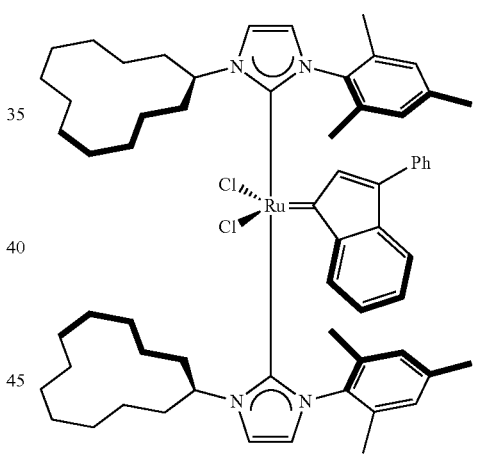 | Soluble |
| 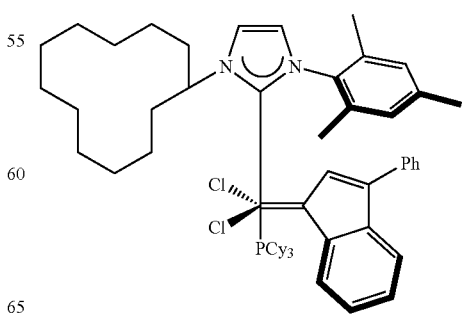 | |

| Catalyst | Solubility |
|---|---|
| IPrC6 (DEMETA): 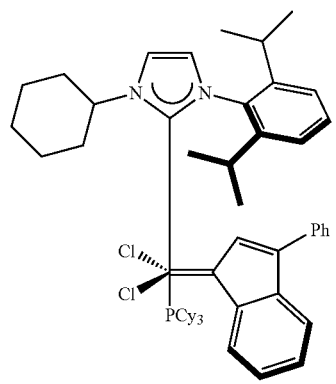 | Partial |

Example 8: Comparative Study of Polymerization

The properties of various catalysts according to the invention as well as of other ruthenium complexes known to be metathesis catalysts (but not necessarily used in ring-opening metathesis of cycloolefins) were evaluated. The protocol followed, and the results obtained, are presented below.

Polymerization Test

A liquid mixture of DCPD with 2 wt % of cyclohexene was prepared. 50 ppm (mole basis) of a catalyst or of a mixture of catalysts dissolved in 200 μL of dichloromethane was added to 120 mL of the resin thus obtained, stirring vigorously for 2 minutes (in order to overcome the problems of solubility of certain catalysts). 3×8 mL of this solution were poured into glass tablet containers of 22×45 mm. The rest of the solution was poured into a test specimen mold preheated to 60° C. Copolymerization of the cycloolefins was carried out at this temperature for 5 to 30 minutes, the reaction time varying depending on the catalyst tested. A post-treatment at 80° C. for 16 h was then carried out on the test specimens thus obtained. We then observed the appearance of the test specimens.

For the latent catalysts of the bis NHC type (Bis C6 and Bis C12), 4.5 equivalents of CuCl were added after complete dissolution of the catalyst (about 1 to 2 hours) to allow for their activation. The reaction temperature could thus be reduced to 40° C. instead of 60° C.

Mechanical Properties

The compressive strength of the test specimens obtained as described above was evaluated according to standard D695-15.

| Catalyst | Polymerization | Compressive strength (MPa) |
|---|---|---|
| Grubbs II (Materia): 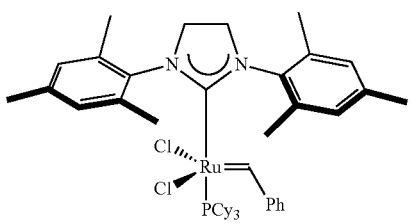 | Formation of bubbles in the test specimen | 74.4 |
| C827 (Materia): 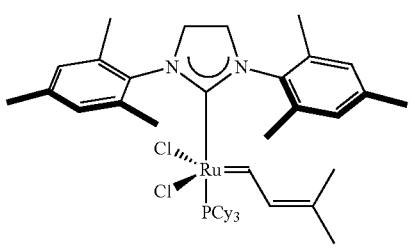 | Test specimen of homogeneous appearance | 55.4 |

| Catalyst | Polymerization | Compressive strength (MPa) |
|---|---|---|
| M2 (Umicore): 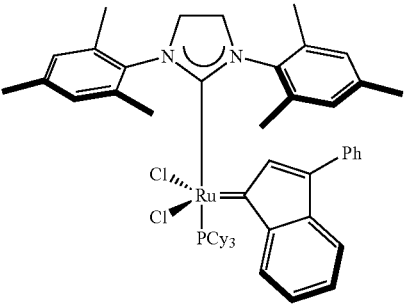 | Presence of bubbles in the test specimen and slight expansion of the latter | 68.5 |
| CatMetium RF1 (Evonik): 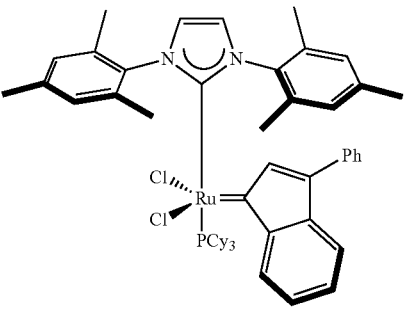 | Test specimen of homogeneous appearance | 58.4 |
| IMes glucose: 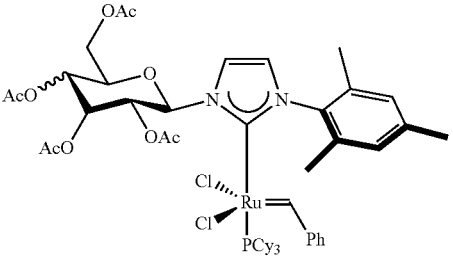 | Test specimen of homogeneous appearance | 44.7 |
| IMesC5 (DEMETA): 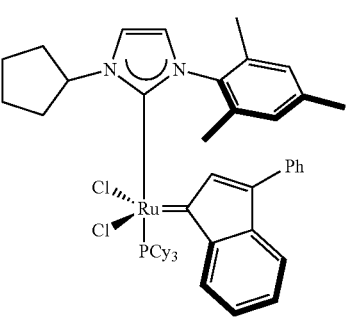 | Test specimen of homogeneous appearance | 72.1 |

-continued
| Catalyst | Polymerization | Compressive strength (MPa) |
|---|---|---|
| BisC6 (DEMETA): 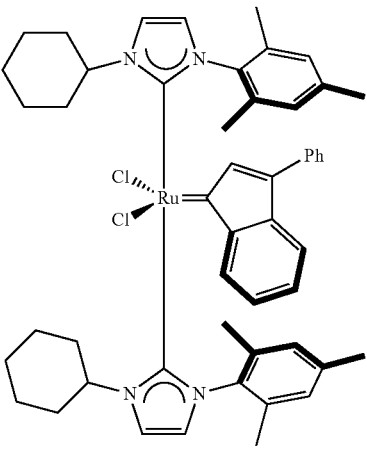 | Test specimen of homogeneous appearance | 72.4 |
| BisC12 (DEMETA): 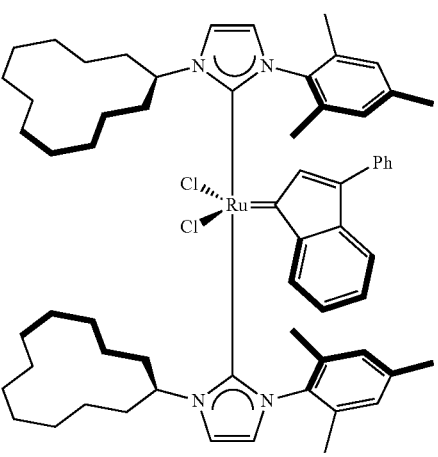 | Test specimen of homogeneous appearance | 74.3 |
| Mixture IMesC12 and BisC12 (1:1) (DEMETA) 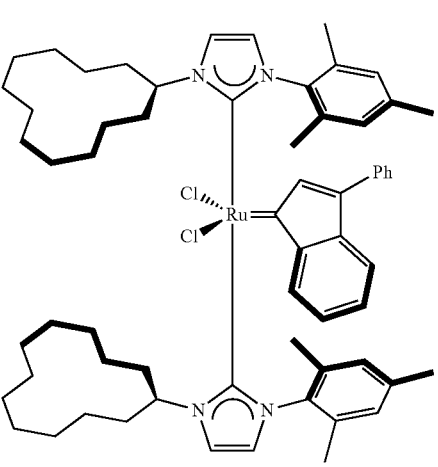 | Test specimen of homogeneous appearance | 71.6 |

| Catalyst | Polymerization | Compressive strength (MPa) |
|---|---|---|
| 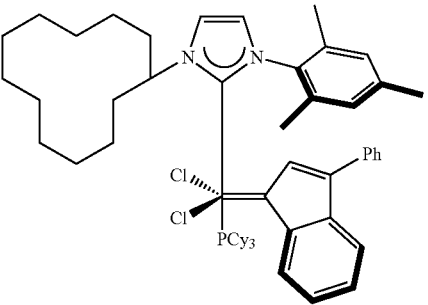 IPrC6 (DEMETA): 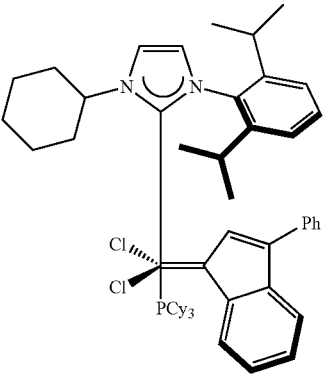 | Test specimen of homogeneous appearance | 76.1 |

As is clear from these tables, although the Grubbs II catalyst has good solubility in the cycloolefins, it causes formation of bubbles in the material. Without wishing to be bound to this theory, these bubbles might be due to excessively rapid polymerization, generating an exothermic peak that leads to the formation of cyclopentadiene starting from DCPD, by retro-Diels-Alder, and evaporation of the cyclopentadiene. For their part, the catalysts C827, IMes Glucose and RF1 do not allow the properties of compressive strength of the material to be maintained and their solubility in the monomers is not optimal. However, the catalysts according to the invention have mechanical properties very similar to those of the Grubbs II catalyst and at least partial solubility in cycloolefins, without requiring organic solvent, while allowing controlled polymerization of DCPD, which is reflected in a homogeneous appearance of the test specimens obtained.

Example 9: Examples of Composite Materials

A) Glass Fiber Composite (450 g/m$^2$)

5 plies of glass fiber mat (450 g/m$^2$) with dimensions of 200×200 mm are deposited on an aluminum plate covered with a PTFE film. A setup for vacuum bag infusion molding is put in place. 60 g of a DCPD/TCPD/5-ethylidene-2-norbornene/Ethanox 4702 mixture (94/6/10/2) containing CuCl (3.6 mg, 0.036 mmol) and 5-vinyl-2-norbornene (0.6 g, 5 mmol) is mixed in a beaker with 60 g of a DCPD/TCPD/5-ethylidene-2-norbornene/Ethanox 4702 mixture (94/6/10/2) in which 2.4 g of a suspension of the Bis-C6 catalyst (48 mg, 0.053 mmol) at 2% in mineral oil is dissolved. The mixture is infused in the fibers. After complete infusion of the fibers, the resin supply is stopped and the setup is left under vacuum until gelation occurs. The plate is removed from the mold and is heated at 120° C. for 1 hour. A homogeneous plate in which the glass fibers are incorporated is obtained.

B) Glass Fiber Composite (280 g/m$^2$)

8 plies of glass fiber taffeta (280 g/m$^2$) with dimensions of 200×200 mm are deposited on an aluminum plate covered with a PTFE film. A setup for vacuum bag infusion molding is put in place. 60 g of a DCPD/TCPD/5-ethylidene-2-norbornene/Ethanox 4702 mixture (94/6/10/2) containing CuCl (3.6 mg, 0.036 mmol) and 5-vinyl-2-norbornene (0.3 g, 2.5 mmol) is mixed in a beaker with 60 g of a DCPD/TCPD/5-ethylidene-2-norbornene/Ethanox 4702 mixture (94/6/10/2) in which 2.4 g of a suspension of the Bis-C6 catalyst (48 mg, 0.053 mmol) at 2% in mineral oil is dissolved. The mixture is infused in the fibers. After complete infusion of the fibers, the resin supply is stopped and the setup is left under vacuum until gelation occurs. The plate is removed from the mold and is heated at 120° C. for 1 hour. A homogeneous plate in which the glass fibers are incorporated is obtained.

C) Carbon Fiber Composite 8 plies of taffeta of carbon fibers (160 g/m$^2$) with dimensions of 230×150 mm are deposited on an aluminum plate covered with a PTFE film. A setup for vacuum bag infusion molding is put in place. 100 g of a DCPD/5-ethylidene-2-norbornene/BHT mixture (100/10/2) containing CuCl (5 mg, 0.05 mmol) is mixed in a beaker with 100 g of a DCPD/5-ethylidene-2-norbornene/BHT mixture (100/10/2) in which 3 g of a suspension of the Bis-C6 catalyst (60 mg, 0.067 mmol) at 2% in mineral oil is dissolved. The mixture is infused in the fibers. After complete infusion of the fibers, the resin supply is stopped and the setup is left under vacuum until gelation occurs. The plate is removed from the mold and is heated at 120° C. for 1 hour. A homogeneous plate in which the carbon fibers are incorporated is obtained.

D) UHMW-PE Spectra® Fiber Composite 20 plies of UHMW-PE Spectra® fiber taffeta (130 g/m$^2$) with dimensions of 200×200 mm are placed on an aluminum plate covered with a PTFE film. A setup for vacuum bag infusion molding is put in place. 300 g of a DCPD/Cyclohexene/BHT/polystyrene-block-polybutadiene-block-polystyrene mixture (100/2/2/5) containing CuCl (7.5 mg, 0.076 mmol) is mixed in a beaker with 9 g of a suspension of the Bis-C6 catalyst (90 mg, 0.1 mmol) at 1% in mineral oil. The mixture is infused in the fibers. After complete infusion of the fibers, the resin supply is stopped and the setup is left under vacuum until gelation occurs. The plate is removed from the mold and is heated at 120° C. for 1 hour. A homogeneous plate in which the UHMW-PE Spectra® fibers are incorporated is obtained.

Example 10: Materials Containing Flame Retardants

Brominated Flame Retardants

A) In a beaker, 50 g of a DCPD/5-ethylidene-2-norbornene/BHT mixture (100/10/2) containing CuCl (3 mg, 0.03 mmol) and 2,4,6-Tris(2,4,6-tribromophenoxy)-1,3,5-triazine (1 g, 0.937 mmol) is mixed with 50 g of a DCPD/5-ethylidene-2-norbornene/BHT mixture (100/10/2) in which 2 g of a suspension of the Bis-C6 catalyst (40 mg, 0.044 mmol) at 2% in mineral oil is dissolved. The mixture is poured into a 150×150 mm mold heated to 60° C. After polymerization, the plate is removed from the mold. A rigid homogeneous plate containing the brominated flame retardant is obtained.

B) In a beaker, 50 g of a DCPD/5-ethylidene-2-norbornene/BHT mixture (100/10/2) containing CuCl (3 mg, 0.03 mmol) and 1,2-bis(2,3,4,5,6-pentabromophenyl)ethane (1 g, 1.03 mmol) is mixed with 50 g of a DCPD/5-ethylidene-2-norbornene/BHT mixture (100/10/2) in which 2 g of a suspension of the Bis-C6 catalyst (40 mg, 0.044 mmol) at 2% in mineral oil is dissolved. The mixture is poured into a 150×150 mm mold heated to 60° C. After polymerization, the plate is removed from the mold. A rigid homogeneous plate containing the brominated flame retardant is obtained.

Phosphorus-Containing Flame Retardant

In a beaker, 50 g of a DCPD/5-ethylidene-2-norbornene/BHT mixture (100/10/2) containing CuCl (3 mg, 0.03 mmol) and triphenyl phosphate (1 g, 0.06 mmol) is mixed with 50 g of a DCPD/5-ethylidene-2-norbornene/BHT mixture (100/10/2) in which 2 g of a suspension of the Bis-C6 catalyst (40 mg, 0.044 mmol) at 2% in mineral oil is dissolved. The mixture is poured into a 150×150 mm mold heated to 60° C. After polymerization, the plate is removed from the mold. A rigid homogeneous plate containing phosphorus-containing flame retardant is obtained.

Example 11: Examples of Polymerization of 2-Norbornene and Cyclooctene

A) 150 mg of 2-norbornene is dissolved in 0.5 mL of DCM and then 3.6 mg of Bis-C6 in solution in 1 mL of DCM is added. After 2 h at room temperature, 2 drops of ethyl-vinyl ether are added and then the mixture is poured into methanol and 114 mg of a solid is recovered, i.e. a yield of 76%. $^1$H NMR indicates that this solid is the expected polymer: $^1$H NMR (300 MHz, CDCl$_3$) monomer: 1.05-1.81 (m, 6H), 2.80-2.45 (dm, 2H), 5.37-5.22 (dm, 2H).

B) 150 mg of cyclooctene is dissolved in 0.5 mL of DCM and then 3.6 mg of Bis-C6 in solution in 1 mL of DCM is added. After stirring for 1.5 h at room temperature, it is left for the VOCs to evaporate and 135 mg of a homogeneous solid is recovered, i.e. 90% yield.

Five basic formulations were employed for carrying out the following examples:

Formulation A: 100 g of ethylidene norbornene and 20 g of Ethanox 4702 were added to 1000 g of DCPD, leading after stirring for 5 minutes to formulation A.

Formulation B: 100 g of ethylidene norbornene and 20 g of BHT were added to 1000 g of DCPD, leading after stirring for 5 minutes to formulation B.

Formulation C: 20 g of Ethanox 4702 was added to 1000 g of Ultrene 99-6, leading after stirring for 5 minutes to formulation C.

Formulation D: 20 g of Ethanox 4702 and 30 mg of CuCl were added to 1000 g of Ultrene 99-6, leading after stirring to formulation D.

Formulation E: 20 g of cyclohexene and 20 g of BHT were added to 1000 g of DCPD, leading after stirring at room temperature to formulation E.

Example 12: Examples of Activation with Copper

A) (Without copper): 50 μL of a solution of Bis-C6 in DCM (61.5 mg, 0.0684 mmol in 0.3 mL of DCM) is added to 30 mL of formulation B. The mixture is put in a beaker at room temperature, and has gelled after 26 h.

B) (With copper): 50 μL of a solution of Bis-C6 in DCM (61.5 mg, 0.0684 mmol in 0.3 mL of DCM) is added to 30 mL of formulation B. 31.3 mg of CuCl is then added and dispersed in the mixture. After stirring for 2 minutes at room temperature, the solution has gelled and an exothermic effect is noted at 3 minutes leading to a rigid cylinder after mold release.

Example 13: Examples of Incorporation of Fragrances

A) (Eucalyptol): 3 mg of CuCl and 1.00 g of eucalyptol were added to 50 g of formulation A, resulting in part 1.2 g of solution of Bis-C6 catalyst at 2 wt % (40 mg, 44.5 μmol) is added to 48 g of formulation B and the mixture is stirred for 5 minutes at room temperature. The two compositions are then mixed and introduced into a mold preheated to 60° C. After 5 minutes, a rigid plate is removed from the mold containing a eucalyptus odor.

B) (Citronellal): 3 mg of CuCl and 1.015 g of citronellal were added to 50 g of formulation A, resulting in part 1.2 g of solution of Bis-C6 catalyst at 2 wt % (40 mg, 44.5 μmol) was added to 48 g of formulation B and the mixture is stirred for 5 minutes at room temperature. The two compositions are then mixed and introduced into a mold preheated to 60° C. After 5 minutes, a rigid plate is removed from the mold containing a citronella odor.

C) (Vanillin): 1.00 g of vanillin and 48 g of formulation D were added to 50 g of formulation C. 2 g of solution of Bis-C6 catalyst at 2 wt % (40 mg, 44.5 μmol) was added to this mixture and the mixture is stirred for 5 minutes at room temperature before being poured into an aluminum vessel preheated to 40° C. After 5 minutes, a rigid block is removed from the mold containing a vanilla odor.

Example 14: Examples of Incorporation of Metal Powders

A) (Iron powder): 3 mg of CuCl and 5.0 g of iron powder were added to 50 g of formulation A, resulting in part 1.2 g of solution of Bis-C6 catalyst at 2 wt % (40 mg, 44.5 µmol) was added to 48 g of formulation B and the mixture is stirred for 5 minutes at room temperature. The two compositions are then mixed and introduced into a mold preheated to 60° C. After 5 minutes, a rigid plate is removed from the mold containing particles.

B) (Copper powder): 3 mg of CuCl and 2.525 g of copper powder were added to 50 g of formulation A, resulting in part 1.2 g of solution of Bis-C6 catalyst at 2 wt % (40 mg, 44.5 µmol) was added to 48 g of formulation B and the mixture is stirred for 5 minutes at room temperature. The two compositions are then mixed and introduced into a mold preheated to 60° C. After 5 minutes, a rigid plate is removed from the mold containing a dispersion of copper within it.

C) (Magnesium powder): 3 mg of CuCl and 5.00 g of magnesium powder were added to 50 g of formulation A, resulting in part 1.2 g of solution of Bis-C6 catalyst at 2 wt % (40 mg, 44.5 µmol) was added to 48 g of formulation B and the mixture is stirred for 5 minutes at room temperature. The two compositions are then mixed and introduced into a beaker and stirred for 5 minutes. After this time, the mixture is polymerized and a rigid cylinder containing a homogeneous dispersion is obtained.

D) (Aluminum powder): 10.0 g of aluminum powder was added to 50 g of formulation C, leading to composition 1.2 g of solution of Bis-C6 catalyst at 2 wt % (40 mg, 44.5 µmol) is added to 48 g of formulation B and the mixture is stirred for 5 minutes at room temperature. The two compositions are then mixed and introduced into a beaker and stirred for 5 minutes. After this time, the mixture is polymerized and a rigid cylinder containing a homogeneous dispersion is obtained.

Example 15: Examples of Incorporation of Expanding Agent 4.04 g of Expancel (sold by the company Nouryon) was added to 100 g of formulation C, leading to composition 1.4 g of solution of Bis-C6 catalyst at 2 wt % (80 mg, 89 µmol) is added to 96 g of formulation D and the mixture is stirred for 5 minutes at room temperature. The two compositions are then mixed and the mixture is poured into a 150×150 mm mold heated to 40° C. After polymerization, the plate is removed from the mold. A rigid homogeneous plate is obtained.

Example 16: Examples of Incorporation of Elastomers

A) (SBS): 120 mg of catalyst mixture Mono/Bis-C6 (45/55) in 250 µL of DCM is added to 600 g of formulation containing a DCPD/Cyclo/BHT/SBS mixture (100/2/2/5). The whole is stirred for 5 minutes and then is poured into a mold preheated to 50° C. After 5 minutes, an opaque rigid material is obtained.

B) (Septon 4055): 24 g (2.5 phr) of Septon 4055 and 90 mg of CuCl are added to 586 g of formulation E. The whole is stirred mechanically and then 12 g of Bis-C6 at 1 wt % (120 mg, 133 µmol) is added while stirring and it is placed in a mold preheated to 40° C. After 5 minutes, an opaque rigid material is obtained.

C) (Vistalon 8800): 90 mg of CuCl and 15 g of Vistalon 8800 are added to 600 g of formulation E. The whole is stirred mechanically and then 12 g of Bis-C6 at 1 wt % (120 mg, 133 µmol) is added while stirring and it is placed in a mold preheated to 40° C. After 5 minutes, an opaque rigid material is obtained.

D) (Kraton FG1901 GT): 37.46 g of Kraton FG1901 GT, 6.4 mg of CuCl and 63.6 mg of PPh3 are added to 389.1 g of formulation F. The whole is stirred mechanically and 3 g of Bis-C6 at 1 wt % (30 mg, 33 µmol) is added to 151.02 g of this composition while stirring and then the whole is poured into a mold preheated to 40° C. After 5 minutes, an opaque rigid material is obtained.

E) (Septon 2006): 8.0 of Septon 2006 and 2.3 mg of CuCl are added to 142.0 g of formulation E. The whole is stirred mechanically and 3 g of Bis-C6 at 1 wt % (30 mg, 33 µmol) is added while stirring and it is poured into a mold preheated to 40° C. After 5 minutes, an opaque rigid material is obtained.

F) (Septon V9461S): 6.6 g of Septon V9461S and 2.3 mg of CuCl are added to 143.4 g of formulation E. The whole is stirred mechanically and 3 g of Bis-C6 at 1 wt % (30 mg, 33 µmol) is added while stirring and it is poured into a mold preheated to 40° C. After 5 minutes, an opaque rigid material is obtained.

G) (Septon Q1250): 2.3 mg of CuCl and 24 mg of PPh3 are added to 150.6 g of formulation G. The whole is stirred and 3 g of Bis-C6 at 1 wt % (30 mg, 33 µmol) is added while stirring and then the whole is poured into a mold preheated to 40° C. After 5 minutes, an opaque rigid material is obtained.

H) (Kraton G1652 EU): 45 mg of CuCl is added to 300 g of formulation H. The whole is stirred and 2.5 g of Bis-C6 at 1 wt % (25 mg, 27.8 µmol) is added to 125.31 g of this composition while stirring and then the whole is poured into a mold preheated to 40° C. After 5 minutes, an opaque rigid material is obtained.

The invention claimed is:
1. A method for the polymerization of cycloolefins by ring-opening metathesis, comprising contacting at least one cycloolefin, optionally functionalized, with at least one metathesis catalyst selected from the ruthenium alkylidene complexes comprising at least one 1-aryl-3-cycloalkyl-imidazolin-2-ylidene ligand, in effective conditions for polymerizing said at least one cycloolefin,
wherein said at least one cycloolefin is cyclopentadiene, cyclopentadiene oligomers, mixtures of cyclopentadiene and cyclopentadiene oligomers, mixtures of cyclopentadiene and at least one other optionally functionalized cycloolefin selected from: norbornene, norbornadiene, dicarboxylic norbornene anhydride, cyclohexene, cycloheptene, cyclooctene, cyclododecene and cyclooctadiene, mixtures of cyclopentadiene oligomers and at least one other optionally functionalized cycloolefin selected from: norbornene, norbornadiene, dicarboxylic norbornene anhydride, cyclohexene, cycloheptene, cyclooctene, cyclododecene and cyclooctadiene, or a mixture of cyclopentadiene, cyclopentadiene oligomers and at least one other optionally functionalized cycloolefin selected from: norbornene, norbornadiene, dicarboxylic norbornene anhydride, cyclohexene, cycloheptene, cyclooctene, cyclododecene and cyclooctadiene.

2. The method as claimed in claim 1, wherein said ruthenium complex is selected from the compounds of formula (1)

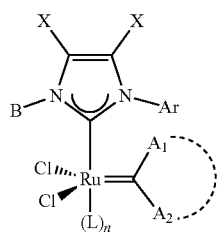
(1)

in which:

X denotes a hydrogen or halogen atom or an alkyl or aryl group,

B denotes a cycloalkyl group,

Ar represents an aryl group optionally substituted with at least one substituent selected from: halogen atoms, trifluoromethyl, nitro, alkyl, heteroalkyl or alkylammonium groups and aryl groups substituted with one or more alkyl groups, L denotes a neutral ligand, A1 represents a hydrogen atom, and A2 represents an alkyl or alkenyl group, an aryl group or a heteroaryl group, or else A1 and A2 together form a carbocycle optionally substituted with at least one group selected from the alkyl, heteroalkyl and aryl groups, and n has a value of 1 or 2.

3. The method as claimed in claim 2, wherein said ruthenium complex is selected from the compounds of formula (1a) or (1b)

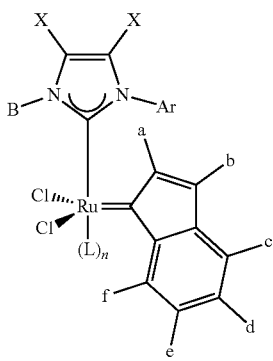
(1a)

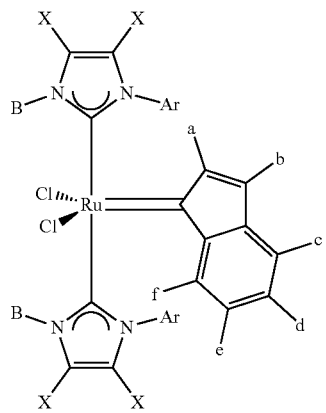
(1b)

in which B is a cycloalkyl group; Ar is an aryl group, unsubstituted or substituted with at least one group selected from the halogen atoms and trifluoromethyl, nitro, alkyl, heteroalkyl, alkylammonium and aryl groups; the groups X are selected independently from the group consisting of a hydrogen atom, a halogen atom, an aryl group and an alkyl group; L is an uncharged ligand; a, b, c, d, e and f are selected independently of one another from the group consisting of a hydrogen atom, an alkyl group, a heteroalkyl group and a phenyl group; and n has a value of 1 or 2.

4. The method as claimed in claim 3, wherein a, c, d, e and f represent a hydrogen atom and b is a phenyl group.

5. The method as claimed in claim 3, wherein Ar is selected from the group consisting of 2,4,6-trimethylphenyl, 2,6-diisopropylphenyl, 2,4,6-tris(trifluoromethyl)phenyl, 2,4,6-trichlorophenyl and hexafluorophenyl.

6. The method as claimed in claim 3, wherein B is selected from the group consisting of cyclopentyl, cyclohexyl, cycloheptyl, cyclooctyl, cyclodecyl, cyclododecyl and cyclopentadecyl.

7. The method as claimed in claim 3, wherein the groups X each represent a hydrogen atom.

8. The method as claimed in claim 3, wherein L is selected from a pyridine, a phosphine trisubstituted with groups selected independently from alkyl, cycloalkyl and aryl groups, a phosphite trisubstituted with groups selected independently from alkyl, cycloalkyl and aryl groups where:

X denotes a hydrogen or halogen atom or an alkyl or aryl group,

B denotes a cycloalkyl group, and

Ar represents an aryl group optionally substituted with at least one substituent selected from: halogen atoms, trifluoromethyl, nitro, alkyl, heteroalkyl or alkylammonium groups and aryl groups substituted with one or more alkyl groups.

9. The method as claimed in claim 3, which is carried out in the presence of a complex of formula (1b), alone or mixed with a complex of formula (1a), optionally having the same groups Ar, B and X, the molar ratio of the complex of formula (1a) to the complex of formula (1b) being between 99:1 and 1:99.

10. The method as claimed in claim 9, which comprises a step of activation of the complex of formula (1b) either thermally, by heating to a temperature in the range from 40 to 120° C., or by adding an activator to the reaction mixture, or by a combination of these methods of activation.

11. The method as claimed in claim 10, wherein the activator is selected from a Lewis acid, a Brønsted acid, or an acidic resin.

12. The method as claimed in claim 11, wherein the Lewis acid is a halide of copper(I) or aluminum or of compounds of formula $ZnR_2$, $SnR_2$, $SnR_4$ and $SiR_4$ where the groups R denote, independently of one another, a halogen atom or an alkyl, cycloalkyl, alkenyl, phenyl or benzyl group and the Brønsted acid is hydrochloric acid, hydrobromic acid, iodic acid, hydrofluoric acid, sulfuric acid, nitric acid, periodic acid, a sulfonic acid, methanesulfonic acid, a monocarboxylic acid or a polycarboxylic acid.

13. The method as claimed in claim 1, which is carried out in the presence of one or more additives or aids, organic and/or inorganic fillers; reinforcements; plasticizers; pigments and/or dyes; antioxidants; surfactants or amphiphilic polymers; flame retardants; UV absorbers; light stabilizers; impact modifiers; antistatic agents; release agents; lubricants; swelling agents; fungicides; and mixtures thereof.

14. The method as claimed in claim 13, wherein the fillers are selected from fibers, powders, granules, beads, microspheres and particles of any shape based on glass, metal oxides, metal carbides, metal nitrides, ceramic, fly-ash, or a thermoplastic or thermosetting polymer or elastomer.

15. The method as claimed in claim 14, wherein the fibers are arranged in the form of mat or fabric and in that the method comprises a step of impregnating the fibers, before polymerization with a mixture of said at least one cycloolefin and said at least one metathesis catalyst.

16. A kit for implementing the method as claimed in claim 1, which contains a composition containing said at least one catalyst in encapsulated form, dispersed in said at least one cycloolefin, or two separate compositions, one of which contains said at least one catalyst and the other contains said at least one cycloolefin.

17. The method as claimed in claim 1, wherein the at least one cycloolefin is dicyclopentadiene or a mixture of dicyclopentadiene with at least one other cycloolefin selected from: norbornene, norbornadiene, dicarboxylic norbornene anhydride, cyclohexene, cycloheptene, cyclooctene, cyclododecene and cyclooctadiene.

* * * * *

UNITED STATES PATENT AND TRADEMARK OFFICE
CERTIFICATE OF CORRECTION

PATENT NO. : 11,261,290 B2
APPLICATION NO. : 16/955812
DATED : March 1, 2022
INVENTOR(S) : Mathieu Rouen et al.

Page 1 of 3

It is certified that error appears in the above-identified patent and that said Letters Patent is hereby corrected as shown below:

In the Specification

Column 26,

Lines 54-65, " 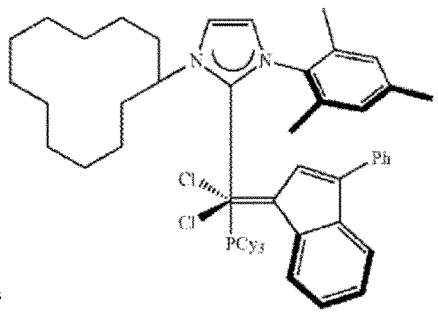 " should read

-- 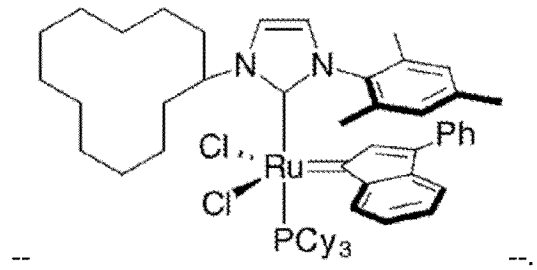 --.

Signed and Sealed this
Thirteenth Day of December, 2022

Katherine Kelly Vidal
*Director of the United States Patent and Trademark Office*

CERTIFICATE OF CORRECTION (continued)
U.S. Pat. No. 11,261,290 B2

Column 27,

Lines 6-20, " 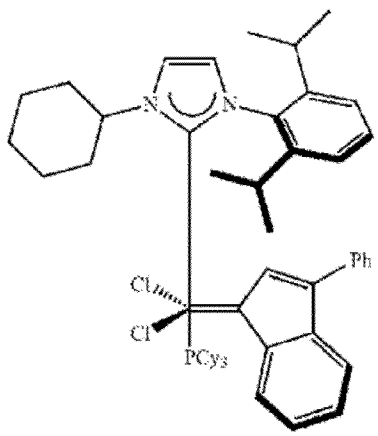 " should read

-- 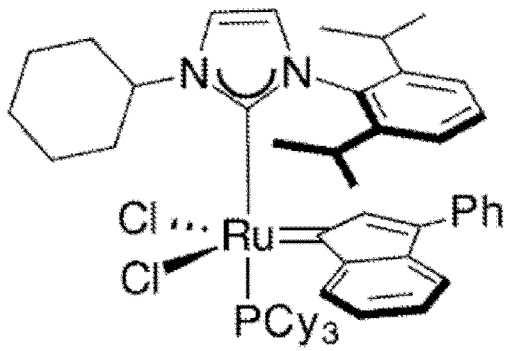 --.

Column 33,

Lines 5-16, " 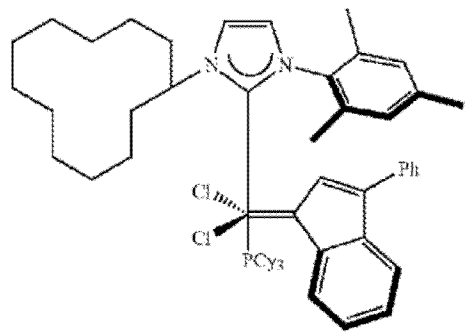 " should read

-- 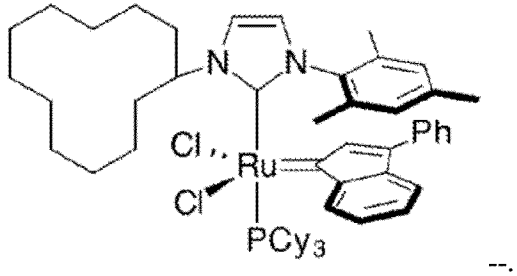 --.

CERTIFICATE OF CORRECTION (continued)
U.S. Pat. No. 11,261,290 B2

Column 33,

Lines 19-32, " 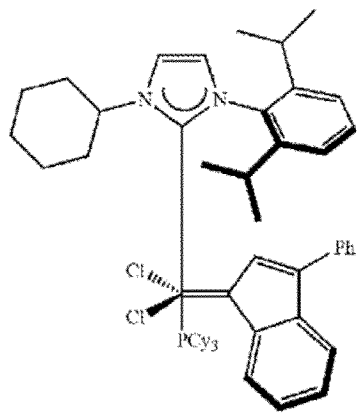 " should read

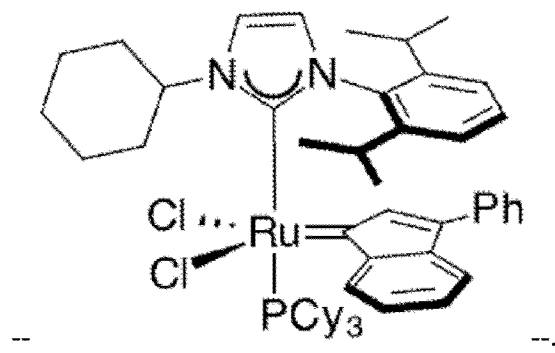

--                                   --.